US011492491B2

(12) United States Patent
Sherman et al.

(10) Patent No.: US 11,492,491 B2
(45) Date of Patent: Nov. 8, 2022

(54) SOLID SILOXANE POLYMERS AS DELIVERY AGENTS FOR SILOXANE TACKIFYING RESINS

(71) Applicant: 3M INNOVATIVE PROPERTIES COMPANY, St. Paul, MN (US)

(72) Inventors: Audrey A. Sherman, Woodbury, MN (US); Kiu-Yuen Tse, Woodbury, MN (US); Jay M. Jennen, Forest Lake, MN (US); Craig E. Hamer, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 441 days.

(21) Appl. No.: 16/632,412

(22) PCT Filed: Aug. 13, 2018

(86) PCT No.: PCT/IB2018/056093
§ 371 (c)(1),
(2) Date: Jan. 20, 2020

(87) PCT Pub. No.: WO2019/043491
PCT Pub. Date: Mar. 7, 2019

(65) Prior Publication Data
US 2021/0147733 A1 May 20, 2021

Related U.S. Application Data

(60) Provisional application No. 62/550,911, filed on Aug. 28, 2017.

(51) Int. Cl.
*C08L 83/10* (2006.01)
*C08L 83/08* (2006.01)
*C09J 183/08* (2006.01)
*C09J 183/10* (2006.01)

(52) U.S. Cl.
CPC .............. *C08L 83/10* (2013.01); *C08L 83/08* (2013.01); *C09J 183/08* (2013.01); *C09J 183/10* (2013.01)

(58) Field of Classification Search
CPC ....... C09J 183/08; C09J 183/10; C08L 83/08; C08L 83/10
See application file for complete search history.

(56) References Cited

U.S. PATENT DOCUMENTS

| 2,676,182 | A | 4/1954 | Daudt |
| 2,736,721 | A | 2/1956 | Dexter |
| 3,627,851 | A | 12/1971 | Brady |
| 3,772,247 | A | 11/1973 | Flannigan |
| 3,890,269 | A | 6/1975 | Martin |
| 4,119,615 | A | 10/1978 | Schulze |
| 4,661,577 | A | 4/1987 | Jo Lane |
| 4,935,484 | A | 6/1990 | Wolfgruber |
| 5,026,890 | A | 6/1991 | Webb |
| 5,082,706 | A | 1/1992 | Tangney |
| 5,110,890 | A | 5/1992 | Butler |
| 5,214,119 | A | 5/1993 | Leir |
| 5,223,465 | A | 6/1993 | Ueki |
| 5,248,739 | A | 9/1993 | Schmidt |
| 5,276,122 | A | 1/1994 | Aoki |
| 5,302,685 | A | 4/1994 | Tsumura |
| RE34,605 | E | 5/1994 | Schrenk |
| 5,319,040 | A | 6/1994 | Wengrovius |
| 5,360,659 | A | 11/1994 | Arends |
| 5,461,134 | A | 10/1995 | Leir |
| 5,512,650 | A | 4/1996 | Leir |
| 5,514,730 | A | 5/1996 | Mazurek |
| 5,579,162 | A | 11/1996 | Bjornard |
| 5,708,098 | A | 1/1998 | Cook |
| 5,882,774 | A | 3/1999 | Jonza |
| 6,049,419 | A | 4/2000 | Wheatley |
| 6,355,759 | B1 | 3/2002 | Sherman |
| 6,407,195 | B2 | 6/2002 | Sherman |
| 6,531,620 | B2 | 3/2003 | Brader |
| 6,534,615 | B2 | 3/2003 | Schafer |
| 7,501,184 | B2 | 3/2009 | Leir |
| 7,705,101 | B2 * | 4/2010 | Sherman ................ C08L 83/00 428/447 |
| 7,883,652 | B2 | 2/2011 | Leir |
| 8,063,166 | B2 | 11/2011 | Sherman |
| 8,361,626 | B2 | 1/2013 | Sherman |

(Continued)

FOREIGN PATENT DOCUMENTS

| JP | H0236234 | 2/1990 |
| WO | WO 2000-68336 | 11/2000 |

(Continued)

OTHER PUBLICATIONS

Encyclopedia of Polymer Science and Engineering, John Wiley & Sons, New York, 1989, vol. 15, pp. 265-270.
Peitz, "Continuous Processing and Pelletizing of Pressure Sensitive Adhesives", Continuous Processing and Pelletizing of Pressure Sensitive Adhesives, TAPPI 1997 Hot Melt Symposium Proceedings, Jun. 15-18, 1997, pp. 159-166.
International Search Report for PCT International Application No. PCT/IB2018/056093, dated Nov. 6, 2018, 4pgs.

*Primary Examiner* — Marc S Zimmer
(74) *Attorney, Agent, or Firm* — Jeffrey M. Olofson

(57) ABSTRACT

Blend compositions include at least one polydiorganosiloxane polyoxamide copolymer, and at least 70% by weight of at least one silicone tackifying resin. The blend composition is non-tacky at room temperature up to a temperature of at least 100° C. The polydiorganosiloxane polyoxamide copolymer can be a linear or branched copolymer. The blend compositions provide solid, non-powdery, and non-tacky delivery vehicles for silicone tackifying resin.

21 Claims, No Drawings

(56) References Cited

U.S. PATENT DOCUMENTS

| | | |
|---|---|---|
| 8,541,481 B2 | 9/2013 | Determan |
| 8,586,668 B2 | 11/2013 | Leir |
| 8,623,988 B2 | 1/2014 | Sherman |
| 8,853,323 B2 | 10/2014 | Leir |
| 9,018,331 B2 | 4/2015 | Sherman |
| 9,206,290 B2 | 12/2015 | Leir |
| 2007/0148475 A1 | 6/2007 | Sherman |
| 2009/0242048 A1* | 10/2009 | Sherman ................ C08J 7/043 |
| | | 428/409 |
| 2011/0212325 A1 | 9/2011 | Determan |
| 2014/0163446 A1* | 6/2014 | Chatterjee ............... D01F 6/78 |
| | | 442/364 |
| 2016/0177037 A1 | 6/2016 | Huggins |

FOREIGN PATENT DOCUMENTS

| | | |
|---|---|---|
| WO | WO 2004-111151 | 12/2004 |
| WO | WO 2006-003853 | 1/2006 |
| WO | WO 2017-147229 | 8/2017 |
| WO | WO 2019-043490 | 3/2019 |

* cited by examiner

SOLID SILOXANE POLYMERS AS DELIVERY AGENTS FOR SILOXANE TACKIFYING RESINS

FIELD OF THE DISCLOSURE

Blends of solid siloxane polymers and silicone tackifying resins are disclosed, where the blends are non-tacky and are useful as delivery agents for silicone tackifying resins in siloxane-based polymeric compositions.

BACKGROUND

Siloxane polymers have unique properties derived mainly from the physical and chemical characteristics of the siloxane bond. These properties include low glass transition temperature, thermal and oxidative stability, resistance to ultraviolet radiation, low surface energy and hydrophobicity, high permeability to many gases, and biocompatibility.

A wide variety of articles have been prepared using siloxane polymers including adhesives, sealants, gaskets, caulks and the like. Among the siloxane polymers that have been highly utilized are polydiorganosiloxane polymers and copolymers. One drawback among many siloxane polymers, including polydiorganosiloxane polymers, is low tensile strength.

The low tensile strength of the siloxane polymers can be improved by forming block copolymers. Some block copolymers contain a "soft" siloxane polymeric block or segment and any of a variety of "hard" blocks or segments. Polydiorganosiloxane polyamides, polydiorganosiloxane polyoxamides, polydiorganosiloxane polyurethanes, and polydiorganosiloxane polyureas are exemplary block copolymers. Each of these types of copolymer has advantages and disadvantages.

In order to utilize these siloxane polymers in useful ways, often additives are blended with the polymers to modify the polymers in a variety of useful ways. Examples of modifying additives include fillers, plasticizers such as oils, and tackifying agents.

In U.S. Pat. No. 5,708,098 (Cook et al.) thermoplastic pellets are formed by blending (A) silicone resins of the MQ-type and (B) silicone fluids, and heating and compression-forming pellets that exhibit plastic flow.

SUMMARY

Disclosed herein are blend compositions, methods of making blend compositions and methods of using blend compositions. The blend compositions comprise a polymeric composition comprising at least one polydiorganosiloxane polyoxamide copolymer, and at least 70% by weight of at least one silicone tackifying resin. The blend composition is non-tacky at room temperature up to a temperature of at least 100° C. The at least one polydiorganosiloxane polyoxamide copolymer can be a linear or branched copolymer.

Also disclosed are methods of preparing blend composition particles comprising providing a polymeric composition comprising at least one polydiorganosiloxane polyoxamide copolymer, providing at least 70% by weight of at least one silicone tackifying resin, mixing the polymeric composition and the at least one silicone tackifying resin to form a blend composition, and forming the blend composition into a particle. As mentioned above, the blend composition particle is non-tacky at room temperature up to a temperature of at least 100° C. Mixing can be carried out by hot melt mixing or by solution mixing.

Also disclosed are methods of using a blend composition comprising providing a blend composition, providing a second polymeric composition comprising at least one polydiorganosiloxane polymer or copolymer, or a reactive composition that upon reaction forms a polydiorganosiloxane polymer or copolymer, and mixing the blend composition with the second polymeric composition to form a second blend composition, wherein the second blend composition comprises less than 70% by weight of the at least one silicon tackifying resin. The blend composition comprises a non-tacky polymeric composition comprising at least one polydiorganosiloxane polyoxamide copolymer, and at least 70% by weight of at least one silicone tackifying resin.

DETAILED DESCRIPTION

Polymeric materials have become prevalent in modern industry and have found widespread uses in a wide range of products and applications. Among the useful classes of polymers are siloxane-based polymeric materials. Often these siloxane-based materials are called "silicones" and the terms are used interchangeably in this disclosure. A particularly useful class of siloxane-based polymers are polydiorganosiloxane polymers. One drawback among many siloxane polymers, including polydiorganosiloxane polymers, is low tensile strength.

The low tensile strength of the siloxane polymers can be improved by forming block copolymers. Some block copolymers contain a "soft" siloxane polymeric block or segment and any of a variety of "hard" blocks or segments. Polydiorganosiloxane polyamides, polydiorganosiloxane polyoxamides, polydiorganosiloxane polyurethanes, and polydiorganosiloxane polyureas are exemplary block copolymers. Each of these types of copolymer has advantages and disadvantages.

Frequently the siloxane-based polymers are used in formulations. By this it is meant that one or more additives are blended with the siloxane-based polymer to form a mixture with desirable properties. A wide range of additives have been used such as fillers, oils, stabilizers, and the like. One extremely common additive is a silicone tackifying resin. These materials used to be described as "silicate resins". A common type of silicone tackifying resin is MQ resin. These resins are described in greater detail below. These resins may be provided as finely divided powders, which makes them difficult to handle in typical laboratory and industrial settings.

Finely divided powders are a known hazard since finely divided solids can give rise to explosions in much the same way as flammable gases. Dust explosions have been known to give rise to serious property damage and even loss of life. Well known examples include explosions at grain elevators, flour mills, and coal mines. However, such explosions can also happen with finely divided plastic materials as well, such as finely divided MQ resin powders.

This hazard can be overcome in a variety of ways. One way is utilize the MQ resin materials in solution. This presents additional problems, however especially in shipping and handling, as the solutions contain a significant quantity of solvent. The use of solvents can simply be replacing one hazard with a different one, since a solvent can also be a hazard as typically solvents are flammable. Also, shipping solutions is expensive and requires extra care.

Perhaps most importantly, as hot melt processing of polymer compositions has become more and more popular and widely used, the use of solutions of MQ resin becomes unworkable, since flammable solutions cannot be fed into an extruder or hot melt mixer.

Another way to overcome this problem is with specialized equipment specially designed to handle finely divided materials. However, such specialized equipment is expensive and not feasible in widespread usage. For example, many industrial locations have extruders already in place and to replace these with extruders that can safely handle finely divided materials such as MQ resin powders may not be an option. Therefore, a method of delivering MQ resins in a solventless form that is not a finely divided powder is desirable.

In this disclosure, blends of MQ resins and polydiorganosiloxane polyoxamide polymers are described. Since MQ resins are known tackifying agents for polydiorganosiloxane polymers including polydiorganosiloxane polyoxamide polymers, to produce, for example, pressure sensitive adhesives, one would expect that the blends would be tacky viscoelastic blends that are difficult to handle. What was discovered instead is that the blends are non-tacky solids that can be easily handled and dispensed in an extruder without the need for any special equipment or handling techniques. It is equally unexpected that the blends form essentially homogeneous blends. By this it is meant that for example, if the blend is in the form of a pellet, if one were to cut open the pellet it does not have a core of MQ resin powder with a shell of polydiorganosiloxane polyoxamide polymer, rather no free powder is present and the cross section where the pellet is cut appears uniform across the entire cut.

Thus, this disclosure describes 100% solids (i.e. solvent free) compositions that have a high level of MQ resin (typically greater than 70% by weight) that are non-tacky even if heated up to temperature of 100° C. and are able to be formed into a wide variety of free-flowing solid forms, such as pellets, flakes, etc. In this way solid MQ resin can be delivered to a hot melt mixing apparatus in a controlled way without the need for special equipment or techniques. As used herein, the term "free-flowing" is used according to its commonly used definition meaning that solid materials of this disclosure flow freely under the conditions of use, as the solid materials are non-tacky under the conditions of use. Typically the solid materials are handled and used at room temperature, but they may be handled and used at elevated temperatures while remaining free-flowing. As free-flowing solid materials, the materials may be readily dispensed from dispensing equipment such as bins, hoppers, chutes and the like and can be stored and/or shipped in vials, drums, bags, or bins without caking or clumping. Thus the free-flowing particles of this disclosure are free-flowing particles that slide over one another easily and exhibit dust-free behavior and are non-blocking, non-caking and non-clumping.

The MQ resin/polydiorganosiloxane polyoxamide polymer solid blends can be used to form a wide range of compositions. The MQ resin/polydiorganosiloxane polyoxamide polymer solid blends can be blended with additional polymers, such as polydiorganosiloxane polymers including polydiorganosiloxane polyoxamide polymers, or even with reactive compositions that can be cured to form siloxane polymeric matrices.

The terms "a", "an", and "the" are used interchangeably with "at least one" to mean one or more of the elements being described.

The term "alkenyl" refers to a monovalent group that is a radical of an alkene, which is a hydrocarbon with at least one carbon-carbon double bond. The alkenyl can be linear, branched, cyclic, or combinations thereof and typically contains 2 to 20 carbon atoms. In some embodiments, the alkenyl contains 2 to 18, 2 to 12, 2 to 10, 4 to 10, 4 to 8, 2 to 8, 2 to 6, or 2 to 4 carbon atoms. Exemplary alkenyl groups include ethenyl, n-propenyl, and n-butenyl.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "alkylene" refers to a divalent or higher valent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "alkoxy" refers to a monovalent group of formula —OR where R is an alkyl group.

The term "alkoxycarbonyl" refers to a monovalent group of formula —(CO)OR where R is an alkyl group and (CO) denotes a carbonyl group with the carbon attached to the oxygen with a double bond.

The term "aralkyl" refers to a monovalent group of formula —$R^a$—Ar where $R^a$ is an alkylene and Ar is an aryl group. That is, the aralkyl is an alkyl substituted with an aryl.

The term "aralkylene" refers to a divalent or higher valent group of formula —$R^a$—$Ar^a$— where $R^a$ is an alkylene and $Ar^a$ is an arylene (i.e., an alkylene is bonded to an arylene).

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "arylene" refers to a divalent or higher valent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "carbonyl" refers to a divalent group of formula —(CO)— where the carbon atom is attached to the oxygen atom with a double bond.

The term "halo" refers to fluoro, chloro, bromo, or iodo.

The term "haloalkyl" refers to an alkyl having at least one hydrogen atom replaced with a halo. Some haloalkyl groups are fluoroalkyl groups, chloroalkyl groups, or bromoalkyl groups.

The term "heteroalkylene" refers to a divalent or higher valent group that includes at least two alkylene groups connected by a thio, oxy, or —NR— where R is alkyl. The heteroalkylene can be linear, branched, cyclic, or combinations thereof and can include up to 60 carbon atoms and up to 15 heteroatoms. In some embodiments, the heteroalkylene includes up to 50 carbon atoms, up to 40 carbon atoms, up to 30 carbon atoms, up to 20 carbon atoms, or up to 10 carbon atoms. Some heteroalkylenes are polyalkylene oxides where the heteroatom is oxygen.

The term "oxalyl" refers to a divalent group of formula —(CO)—(CO)— where each (CO) denotes a carbonyl group.

The terms "oxalylamino" and "aminoxalyl" are used interchangeably to refer to a divalent group of formula —(CO)—(CO)—NH— where each (CO) denotes a carbonyl.

The term "aminoxalylamino" refers to a divalent group of formula —NH—(CO)—(CO)—NR$^d$— where each (CO) denotes a carbonyl group and R$^d$ is hydrogen, alkyl, or part of a heterocyclic group along with the nitrogen to which they are both attached. In most embodiments, R$^d$ is hydrogen or alkyl. In many embodiments, R$^d$ is hydrogen.

The terms "polymer" and "polymeric material" refer to both materials prepared from one monomer such as a homopolymer or to materials prepared from two or more monomers such as a copolymer, terpolymer, or the like. Likewise, the term "polymerize" refers to the process of making a polymeric material that can be a homopolymer, copolymer, terpolymer, or the like. The terms "copolymer" and "copolymeric material" refer to a polymeric material prepared from at least two monomers.

As mentioned above, the terms "siloxane" and "silicone" are used interchangeably and refer to polymers or polymer precursors which contain siloxane units. Siloxane units refer to dialkyl or diaryl siloxane (—SiR$_2$O—) repeating units.

The term "polydiorganosiloxane" refers to a divalent segment of formula:

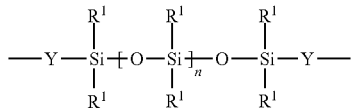

where each R$^1$ is independently an alkyl, haloalkyl, aralkyl, alkenyl, aryl, or aryl substituted with an alkyl, alkoxy, or halo; each Y is independently an alkylene, aralkylene, or a combination thereof; and subscript n is independently an integer of 0 to 1500.

The terms "room temperature" and "ambient temperature" are used interchangeably to mean temperatures in the range of 20° C. to 25° C.

The terms "Tg" and "glass transition temperature" are used interchangeably. If measured, Tg values are determined by Differential Scanning calorimetry (DSC) at a scan rate of 10° C./minute, unless otherwise indicated. Typically, Tg values for copolymers are not measured but are calculated using the well-known Fox Equation, using the monomer Tg values provided by the monomer supplier, as is well understood by one of skill in the art The term "adhesive" as used herein refers to polymeric compositions useful to adhere together two adherends. Examples of adhesives are heat activated adhesives, and pressure sensitive adhesives.

Heat activated adhesives are non-tacky at room temperature but become tacky and capable of bonding to a substrate at elevated temperatures. These adhesives usually have a glass transition temperature (Tg) or melting point (Tm) above room temperature. When the temperature is elevated above the Tg or Tm, the storage modulus usually decreases and the adhesive become tacky.

Pressure sensitive adhesive compositions are well known to those of ordinary skill in the art to possess at room temperature properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

Disclosed herein are solid non-tacky blend compositions comprising at least one polydiorganosiloxane polyoxamide copolymer and at least 70% by weight of at least one silicone tackifying resin. Also disclosed herein are methods for preparing the blend compositions and methods of using the blend compositions. In particular, the blend compositions are useful delivery agents for solid silicone tackifying resin to a polymeric composition. Examples of compositions that may be prepared in this way are pressure sensitive adhesives.

Blend compositions of this disclosure comprise a polymeric composition comprising at least one polydiorganosiloxane polyoxamide copolymer, and at least 70% by weight of at least one silicone tackifying resin. The blend composition is a solid blend composition that is non-tacky at room temperature up to a temperature of at least 100° C. As was mentioned above, since silicone tackifying resins are tackifying agents for siloxane polymers such as polydiorganosiloxane polyoxamide copolymers, it is surprising that non-tacky solid compositions can be formed from blends of polydiorganosiloxane polyoxamide copolymer and silicone tackifying resins.

A wide variety of polydiorganosiloxane polyoxamide copolymers are suitable for use in the blend compositions of this disclosure. In some embodiments, the at least one polydiorganosiloxane polyoxamide block copolymers comprises a linear copolymer that contains at least two repeat units of Formula I:

Formula I

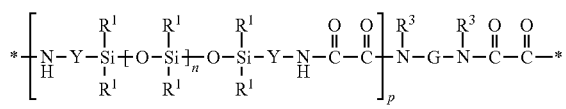

wherein each R$^1$ is independently an alkyl, haloalkyl, aralkyl, alkenyl, aryl, or aryl substituted with an alkyl, alkoxy, or halo; each Y is independently an alkylene, aralkylene, or a combination thereof; the subscript n is an integer of 0 to 1500; the subscript p is an integer of 1 to 10; G is a divalent linking group that is the residue unit of a diamine of formula R$^3$HN-G-NHR$^3$ minus the two —NHR$^3$ groups; R$^3$ is hydrogen or alkyl having 1 to 10 carbon atoms, or R$^3$ taken together with G and with the nitrogen to which they are both attached form a heterocyclic group; and each asterisk (*) indicates a site of attachment of the repeat unit to another group in the copolymer.

Suitable alkyl groups for $R^1$ in Formula I typically have 1 to 10, 1 to 6, or 1 to 4 carbon atoms. Exemplary alkyl groups include, but are not limited to, methyl, ethyl, isopropyl, n-propyl, n-butyl, and iso-butyl. Suitable haloalkyl groups for $R^1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for $R^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^1$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R^1$ usually have an alkylene group with 1 to 10 carbon atoms and an aryl group with 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

In some repeat units of Formula I, at least 50 percent of the $R^1$ groups are methyl. For example, at least 60 percent, at least 70 percent, at least 80 percent, at least 90 percent, at least 95 percent, at least 98 percent, or at least 99 percent of the $R^1$ groups can be methyl. The remaining $R^1$ groups can be selected from an alkyl having at least two carbon atoms, haloalkyl, aralkyl, alkenyl, aryl, or aryl substituted with an alkyl, alkoxy, or halo.

Each Y in Formula I is independently an alkylene, aralkylene, or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group with 6 to 12 carbon atoms bonded to an alkylene group with 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each subscript n in Formula I is independently an integer of 0 to 1500. For example, subscript n can be an integer up to 1000, up to 500, up to 400, up to 300, up to 200, up to 100, up to 80, up to 60, up to 40, up to 20, or up to 10. The value of n is often at least 1, at least 2, at least 3, at least 5, at least 10, at least 20, or at least 40. For example, subscript n can be in the range of 40 to 1500, 0 to 1000, 40 to 1000, 0 to 500, 1 to 500, 40 to 500, 1 to 400, 1 to 300, 1 to 200, 1 to 100, 1 to 80, 1 to 40, 1 to 20, 1 to 10, or 0 to 10.

The subscript p is an integer of 1 to 10. For example, the value of p is often an integer up to 9, up to 8, up to 7, up to 6, up to 5, up to 4, up to 3, or up to 2. The value of p can be in the range of 1 to 8, 1 to 6, or 1 to 4.

Group G in Formula I is a residual unit that is equal to a diamine compound of formula $R^3HN$-G-$NHR^3$ minus the two amino groups (i.e., $-NHR^3$ groups). The diamine can have primary or secondary amino groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN$-G-$NHR^3$ is piperazine). In most embodiments, $R^3$ is hydrogen or an alkyl. In many embodiments, both of the amino groups of the diamine are primary amino groups (i.e., both $R^3$ groups are hydrogen) and the diamine is of formula H2N-G-NH2.

In some embodiments, G is an alkylene, heteroalkylene, polydiorganosiloxane, arylene, aralkylene, or a combination thereof. Suitable alkylenes often have 2 to 10, 2 to 6, or 2 to 4 carbon atoms. Exemplary alkylene groups include ethylene, propylene, butylene, and the like. Suitable heteroalkylenes are often polyoxyalkylenes such as polyoxyethylene having at least 2 ethylene units, polyoxypropylene having at least 2 propylene units, or copolymers thereof. Suitable polydiorganosiloxanes include the polydiorganosiloxane diamines which are described below, minus the two amino groups.

Exemplary polydiorganosiloxanes include, but are not limited to, polydimethylsiloxanes with alkylene Y groups. Suitable aralkylene groups usually contain an arylene group having 6 to 12 carbon atoms bonded to an alkylene group having 1 to 10 carbon atoms. Some exemplary aralkylene groups are phenylene-alkylene where the phenylene is bonded to an alkylene having 1 to 10 carbon atoms, 1 to 8 carbon atoms, 1 to 6 carbon atoms, or 1 to 4 carbon atoms. As used herein with reference to group G, "a combination thereof" refers to a combination of two or more groups selected from an alkylene, heteroalkylene, polydiorganosiloxane, arylene, and aralkylene. A combination can be, for example, an aralkylene bonded to an alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

In some particular embodiments, G is a polydiorganosiloxane, prepared from polydiorganosiloxane diamines of the formula:

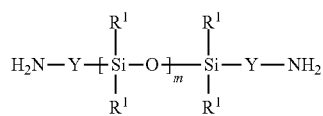

Formula VI where the groups $R^1$ and Y are the same as described above, and the subscript m is an integer greater than 1, where G is the diamine minus the two $-NH2$ groups. Exemplary polydiorganosiloxanes include, but are not limited to, polydimethylsiloxanes with alkylene Y groups.

The polydiorganosiloxane diamine of Formula VI can be prepared by any known method and can have any suitable molecular weight, such as an average molecular weight in the range of 700 to 150,000 g/mole. Suitable polydiorganosiloxane diamines and methods of making the polydiorganosiloxane diamines are described, for example, in U.S. Pat. No. 3,890,269 (Martin), U.S. Pat. No. 4,661,577 (Jo Lane et al.), U.S. Pat. No. 5,026,890 (Webb et al.), U.S. Pat. No. 5,276,122 (Aoki et al.), U.S. Pat. No. 5,214,119 (Leir et al.), U.S. Pat. No. 5,461,134 (Leir et al.), U.S. Pat. No. 5,512,650 (Leir et al.), U.S. Pat. No. 6,355,759 (Sherman et al.), U.S. Pat. Nos. 6,531,620 and 6,534,615 (Brader et al.), and US Patent Publication No. 2016/0177037 (Huggins et al.). Some polydiorganosiloxane diamines are commercially available, for example, from Shin Etsu Silicones of America, Inc., Torrance, Calif. and from Gelest Inc., Morrisville, Pa., and Wacker Chemicals, Munich, Germany.

The polydiorganosiloxane polyoxamide tends to be free of groups having a formula

$$—R^a—(CO)—NH—$$

where $R^a$ is an alkylene. All of the carbonylamino groups along the backbone of the copolymeric material are part of an oxalylamino group (i.e., the —(CO)—(CO)—NH— group). That is, any carbonyl group along the backbone of the copolymeric material is bonded to another carbonyl group and is part of an oxalyl group. More specifically, the polydiorganosiloxane polyoxamide has a plurality of aminoxalylamino groups.

The polydiorganosiloxane polyoxamide is a linear, block copolymer and can be an elastomeric material. Unlike many of the known polydiorganosiloxane polyamides that are generally formulated as brittle solids or hard plastics, the polydiorganosiloxane polyoxamides can be formulated to include greater than 50 weight percent polydiorganosiloxane segments based on the weight of the copolymer. The weight percent of the diorganosiloxane in the polydiorganosiloxane polyoxamides can be increased by using higher molecular weight polydiorganosiloxanes segments to provide greater than 60 weight percent, greater than 70 weight percent, greater than 80 weight percent, greater than 90 weight percent, greater than 95 weight percent, or greater than 98 weight percent of the polydiorganosiloxane segments in the polydiorganosiloxane polyoxamides. Higher amounts of the polydiorganosiloxane can be used to prepare elastomeric materials with lower modulus while maintaining reasonable strength.

Some of the polydiorganosiloxane polyoxamides can be heated to a temperature up to 200° C., up to 225° C., up to 250° C., up to 275° C., or up to 300° C. without noticeable degradation of the material. For example, when heated in a thermogravimetric analyzer in the presence of air, the copolymers often have less than a 10 percent weight loss when scanned at a rate 50° C. per minute in the range of 20° C. to about 350° C. Additionally, the copolymers can often be heated at a temperature such as 250° C. for 1 hour in air without apparent degradation as determined by no detectable loss of mechanical strength upon cooling.

The copolymeric material of Formula I can be optically clear. As used herein, the term "optically clear" refers to a material that is clear to the human eye. An optically clear copolymeric material often has a luminous transmission of at least about 90 percent, a haze of less than about 2 percent, and opacity of less than about 1 percent in the 400 to 700 nm wavelength range. Both the luminous transmission and the haze can be determined using, for example, the method of ASTM-D 1003-95.

Additionally, the copolymeric material of Formula I can have a low refractive index. As used herein, the term "refractive index" refers to the absolute refractive index of a material (e.g., copolymeric material) and is the ratio of the speed of electromagnetic radiation in free space to the speed of the electromagnetic radiation in the material of interest. The electromagnetic radiation is white light. The index of refraction is measured using an Abbe refractometer, available commercially, for example, from Fisher Instruments of Pittsburgh, Pa. The measurement of the refractive index can depend, to some extent, on the particular refractometer used. The copolymeric material usually has a refractive index in the range of about 1.41 to about 1.50.

The preparation of such copolymers is described in, for example, U.S. Pat. Nos. 7,501,184, 7,883,652, 8,586,668, 8,853,323, and 9,206,290.

An additional benefit of the blend compositions of this disclosure is that the polydiorganosiloxane polyoxamide copolymers, while thermally and UV stable have recently been found to depolymerize when exposed to UV radiation at or below the B spectral range. This depolymerization is described in detail in U.S. Patent Ser. No. 62/299,221 filed Feb. 24, 2016.

While the polydiorganosiloxane polyoxamide polymers have high thermal and environmental stability, it has been discovered that the oxamide linkages absorb ultraviolet radiation at wavelengths at or below the B spectral range. Upon absorption of the UV radiation, the oxamide linkage breaks, causing de-polymerization of the polydiorganosiloxane polyoxamide polymer.

Ultraviolet or UV radiation is a portion of the electromagnetic spectrum located in the wavelength region between visible light and X-ray radiation with wavelengths of from 400 nanometers (nm) to 100 nm. UV radiation is typically subdivided into regions that are described as UVA (315-400 nm), UVB (280-315 nm) and UVC (100-280). In nature, the long wavelength UVA light is not absorbed by the ozone layer, the medium wavelength UVB is mostly absorbed by the ozone layer, and the short wavelength UVC is completely absorbed by the ozone layer. Thus UVC and much of UVB radiation is not present in natural light.

The polydiorganosiloxane polyoxamide copolymers while transmissive of visible light and UVA radiation, absorb light in the range of 315 nm and below (the UVB and UVC wavelength range). The oxamide linkages in the polydiorganosiloxane polyoxamide copolymers is responsible for this absorbance, as similar siloxane polyurea copolymers do not demonstrate this absorbance behavior. A consequence of this absorbance is that when the polydiorganosiloxane polyoxamide copolymers are exposed to UV radiation at or below the B spectral range, the copolymers absorb the radiation and this absorption causes de-polymerization of the polydiorganosiloxane polyoxamide copolymers. At least one product of this de-polymerization is a siloxane fluid.

This unusual property of polydiorganosiloxane polyoxamide copolymers permits a wide range of formulation latitude in the use of the blend compositions of the present disclosure as a delivery system for silicone tackifying resins. When the blend compositions are added to a formulation, if the polydiorganosiloxane polyoxamide copolymer is not desired, the formulator can convert the polydiorganosiloxane polyoxamide copolymer to a siloxane fluid by exposing the formulation to UV radiation at or below the B spectral range. Also, if one merely wished to modify the polydiorganosiloxane polyoxamide copolymer present in the formulation, one can used controlled exposure to UV radiation at or below the B spectral range to effect the modification.

In other embodiments, the at least one polydiorganosiloxane polyoxamide copolymer comprises a copolymer of general Formula II:

Formula II

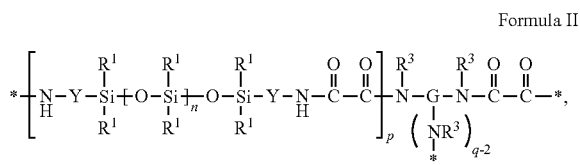

where each $R^1$ is independently an alkyl, haloalkyl, aralkyl, alkenyl, aryl, or aryl substituted with an alkyl, alkoxy, or halo; G is a q-valent residue unit of a polyamine of the formula $G(NHR^3)_q$ minus the q-$NHR^3$ groups; subscript q is an integer of 2 or greater; each $R^3$ is hydrogen or an alkyl having 1 to 10 carbon atoms, or $R^3$ taken together with G and with the nitrogen to which they are both attached forms a heterocyclic group; each Y is independently an alkylene, aralkylene, or a combination thereof; subscript n is independently an integer of 0 to 1500; subscript p is an integer of 1 to 10; and each asterisk (*) indicates a site of attachment of the repeat unit to another group in the copolymer.

In these Formula II, each $R^1$ is independently an alkyl, haloalkyl, aralkyl, alkenyl, aryl, or aryl substituted with an alkyl, alkoxy, or halo. G is a q-valent residue unit equal to the formula $G(NHR^3)_q$ minus the q-$NHR^3$ groups, and q is an integer of 2 or greater. In certain embodiments q can, for example, be equal to 2, 3, or 4. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3$HN-G-$NHR^3$ is piperazine or the like). Each Y is independently an alkylene, aralkylene, or a combination thereof. D is an organic soft segment residue. Subscript n is independently an integer of 0 to 1500 and the subscript p is an integer of 1 to 10. Each asterisk (*) indicates a site of attachment of the repeat unit to another group in the copolymer.

Suitable alkyl groups for $R^1$ in Formula II typically have 1 to 10, 1 to 6, or 1 to 4 carbon atoms. Exemplary alkyl groups include, but are not limited to, methyl, ethyl, iso-propyl, n-propyl, n-butyl, and iso-butyl. Suitable haloalkyl groups for $R^1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for $R^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^1$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R^1$ usually have an alkylene group with 1 to 10 carbon atoms and an aryl group with 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

In some repeat units of Formula II, all $R^1$ groups can be one of alkyl, haloalkyl, aralkyl, alkenyl, aryl, or aryl substituted with an alkyl, alkoxy, or halo (e.g., all $R^1$ Groups are an alkyl such as methyl or an aryl such as phenyl). In some compounds of Formula II, the $R^1$ groups are mixtures of two or more selected from the group consisting of alkyl, haloalkyl, aralkyl, alkenyl, aryl, and aryl substituted with an alkyl, alkoxy, or halo in any ratio. Thus, for example, in certain compounds of Formula II, 0%, 1%, 2, %, 5%, 10%, 20%, 30%, 40%, 50%, 60%, 70%, 80%, 90%, 95%, 98%, 99%, or 100% of the $R^1$ groups can be methyl; and 100%, 99%, 98%, 95%, 90%, 80%, 70%, 60%, 50%, 40%, 30%, 20%, 10%, 5%, 2%, 1%, or 0% of the $R^1$ groups can be phenyl.

In some repeat units of Formula II at least 50 percent of the $R^1$ groups are methyl. For example, at least 60 percent, at least 70 percent, at least 80 percent, at least 90 percent, at least 95 percent, at least 98 percent, or at least 99 percent of the $R^1$ groups can be methyl. The remaining $R^1$ groups can be selected from an alkyl having at least two carbon atoms, haloalkyl, aralkyl, alkenyl, aryl, or aryl substituted with an alkyl, alkoxy, or halo.

Each Y in Formula II is independently an alkylene, aralkylene, or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group with 6 to 12 carbon atoms bonded to an alkylene group with 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each subscript n in Formula II is independently an integer of 0 to 1500. For example, subscript n can be an integer up to 1000, up to 500, up to 400, up to 300, up to 200, up to 100, up to 80, up to 60, up to 40, up to 20, or up to 10. The value of n is often at least 1, at least 2, at least 3, at least 5, at least 10, at least 20, or at least 40. For example, subscript n can be in the range of 40 to 1500, 0 to 1000, 40 to 1000, 0 to 500, 1 to 500, 40 to 500, 1 to 400, 1 to 300, 1 to 200, 1 to 100, 1 to 80, 1 to 40, 1 to 20, 1 to 10, or 0 to 10.

The subscript p is an integer of 1 to 10. For example, the value of p is often an integer up to 9, up to 8, up to 7, up to 6, up to 5, up to 4, up to 3, or up to 2. The value of p can be in the range of 1 to 8, 1 to 6, or 1 to 4.

Group G in Formula II a is a residual unit that is equal to a diamine or polyamine compound of formula $G(NHR^3)_q$ minus the q amino groups (i.e., —$NHR^3$ groups), where q is an integer of 2 or greater. The diamine and/or polyamine can have primary and/or secondary amino groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3$HN-G-$NHR^3$ is piperazine). In most embodiments, $R^3$ is hydrogen or an alkyl. In many embodiments, all of the amino groups of the diamine and/or polyamine are primary amino groups (i.e., all the $R^3$ groups are hydrogen) and the diamine and/or polyamine are of the formula $G(NH2)_q$ (e.g., a diamine of the formula H2N-G-NH2 when q=2).

In certain embodiments, Group G in Formula II is a mixture of residual units that are equal to (i) a diamine compound of the formula $R^3$HN-G-$NHR^3$ minus the two amino groups (i.e., —NHR³ groups) and (ii) a polyamine compound of the formula G(NHR³)$_q$ minus the q amino groups (i.e., —NHR³ groups), where q is an integer greater than 2. In such embodiments, the polyamine compound of formula G(NHR³)$_q$ can be, but is not limited to, triamine compounds (i.e., q=3), tetraamine compounds (i.e., q=4), and combinations thereof. In such embodiments, the number of equivalents of polyamine (ii) per equivalent of diamine (i) is generally at least 0.001, more generally at least 0.005, and most generally at least 0.01. In such embodiments, the number of equivalents of polyamine (ii) per equivalent of diamine (i) is generally at most 3, more typically at most 2, and most typically at most 1.

When G includes residual units that are equal to (i) a diamine compound of formula R³HN-G-NHR³ minus the two amino groups (i.e., —NHR³ groups), G can be an alkylene, heteroalkylene, polydiorganosiloxane, arylene, aralkylene, or a combination thereof. Suitable alkylenes often have 2 to 10, 2 to 6, or 2 to 4 carbon atoms. Exemplary alkylene groups include ethylene, propylene, butylene, and the like. Suitable heteroalkylenes are often polyoxyalkylenes such as polyoxyethylene having at least 2 ethylene units, polyoxypropylene having at least 2 propylene units, or copolymers thereof. Suitable polydiorganosiloxanes include the polydiorganosiloxane diamines of the formula:

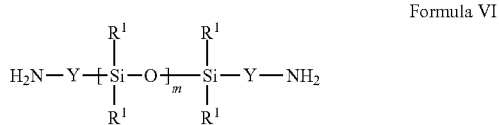

Formula VI where the groups R¹ and Y are the same as described above, and the subscript m is an integer greater than 1, minus the two amino groups. Exemplary polydiorganosiloxanes include, but are not limited to, polydimethylsiloxanes with alkylene Y groups. Suitable aralkylene groups usually contain an arylene group having 6 to 12 carbon atoms bonded to an alkylene group having 1 to 10 carbon atoms. Some exemplary aralkylene groups are phenylene-alkylene where the phenylene is bonded to an alkylene having 1 to 10 carbon atoms, 1 to 8 carbon atoms, 1 to 6 carbon atoms, or 1 to 4 carbon atoms. As used herein with reference to group G, "a combination thereof" refers to a combination of two or more groups selected from an alkylene, heteroalkylene, polydiorganosiloxane, arylene, and aralkylene. A combination can be, for example, an aralkylene bonded to an alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Some of the polydiorganosiloxane polyoxamides can be heated to a temperature up to 200° C., up to 225° C., up to 250° C., up to 275° C., or up to 300° C. without noticeable degradation of the material. For example, when heated in a thermogravimetric analyzer in the presence of air, the copolymers often have less than a 10 percent weight loss when scanned at a rate 50° C. per minute in the range of 20° C. to 350° C. Additionally, the copolymers can often be heated at a temperature such as 250° C. for 1 hour in air without apparent degradation as determined by no detectable loss of mechanical strength upon cooling.

The copolymeric material having repeat units of Formula II can be optically clear. As used herein, the term "optically clear" refers to a material that is clear to the human eye. An optically clear copolymeric material often has a luminous transmission of at least 90 percent, a haze of less than 2 percent, and opacity of less than 1 percent in the 400 to 700 nm wavelength range. Both the luminous transmission and the haze can be determined using, for example, the method of ASTM-D 1003-95.

Additionally, the copolymeric material having repeat units of Formula II can have a low refractive index. As used herein, the term "refractive index" refers to the absolute refractive index of a material (e.g., copolymeric material) and is the ratio of the speed of electromagnetic radiation in free space to the speed of the electromagnetic radiation in the material of interest. The electromagnetic radiation is white light. The index of refraction is measured using an Abbe refractometer, available commercially, for example, from Fisher Instruments of Pittsburgh, Pa. The measurement of the refractive index can depend, to some extent, on the particular refractometer used. For some embodiments (e.g., embodiments in which the copolymer includes a polydimethylsiloxane segment), the copolymeric material can have a refractive index in the range of 1.41 to 1.50. For some other embodiments (e.g., embodiments in which the copolymer includes a polyphenylsiloxane or a polydiphenylsiloxane segment), the copolymeric material can have a refractive index in the range of from 1.46 to 1.55.

The preparation of such polymers is described, for example in U.S. Pat. Nos. 8,063,166, 8,361,626, 8,623,988, and 9,018,331.

As was discussed above regarding the linear polydiorganosiloxane polyoxamide copolymers, an additional benefit of the blend compositions of this disclosure is that the polydiorganosiloxane polyoxamide copolymers, while thermally and UV stable have recently been found to depolymerize when exposed to UV radiation at or below the B spectral range. This depolymerization is described in detail in U.S. Patent Ser. No. 62/299,221 filed Feb. 24, 2016.

While the polydiorganosiloxane polyoxamide polymers have high thermal and environmental stability, it has been discovered that the oxamide linkages absorb ultraviolet radiation at wavelengths at or below the B spectral range. Upon absorption of the UV radiation, the oxamide linkage breaks, causing de-polymerization of the polydiorganosiloxane polyoxamide polymer.

Ultraviolet or UV radiation is a portion of the electromagnetic spectrum located in the wavelength region between visible light and X-ray radiation with wavelengths of from 400 nanometers (nm) to 100 nm. UV radiation is typically subdivided into regions that are described as UVA (315-400 nm), UVB (280-315 nm) and UVC (100-280). In nature, the long wavelength UVA light is not absorbed by the ozone layer, the medium wavelength UVB is mostly absorbed by the ozone layer, and the short wavelength UVC is completely absorbed by the ozone layer. Thus UVC and much of UVB radiation is not present in natural light.

The polydiorganosiloxane polyoxamide copolymers while transmissive of visible light and UVA radiation, absorb light in the range of 315 nm and below (the UVB and UVC wavelength range). The oxamide linkages in the polydiorganosiloxane polyoxamide copolymers is responsible for this absorbance, as similar siloxane polyurea copolymers do not demonstrate this absorbance behavior. A consequence of this absorbance is that when the polydiorganosiloxane polyoxamide copolymers are exposed to UV radiation at or below the B spectral range, the copolymers absorb the radiation and this absorption causes de-polymerization of the polydiorganosiloxane polyoxamide copolymers. At least one product of this de-polymerization is a siloxane fluid.

This unusual property of polydiorganosiloxane polyoxamide copolymers permits a wide range of formulation latitude in the use of the blend compositions of the present disclosure as a delivery system for silicone tackifying resins. When the blend compositions are added to a formulation, if the polydiorganosiloxane polyoxamide copolymer is not desired, the formulator can convert the polydiorganosiloxane polyoxamide copolymer to a siloxane fluid by exposing the formulation to UV radiation at or below the B spectral range. Also, if one merely wished to modify the polydiorganosiloxane polyoxamide copolymer present in the formulation, one can used controlled exposure to UV radiation at or below the B spectral range to effect the modification.

In other embodiments of this disclosure, the polydiorganosiloxane polyoxamide block copolymers are non-linear copolymers including at least one repeat unit of Formula II:

Formula II

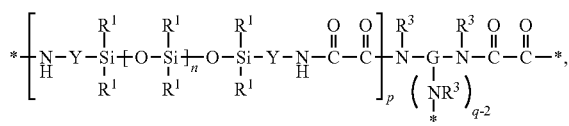

and at least one repeat unit of Formula III:

Formula III

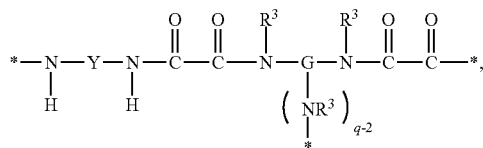

where each $R^1$ is independently an alkyl, haloalkyl, aralkyl, alkenyl, aryl, or aryl substituted with an alkyl, alkoxy, or halo; G is a q-valent residue unit of a polyamine of the formula $G(NHR^3)_q$ minus the $q$-$NHR^3$ groups; subscript q is an integer of 2 or greater; each $R^3$ is hydrogen or an alkyl having 1 to 10 carbon atoms, or $R^3$ taken together with G and with the nitrogen to which they are both attached forms a heterocyclic group; each Y is independently an alkylene, aralkylene, or a combination thereof; subscript n is independently an integer of 0 to 1500; subscript p is an integer of 1 to 10; D is a polyoxyalkylene group; and each asterisk (*) indicates a site of attachment of the repeat unit to another group in the copolymer.

In these formulas, each $R^1$ is independently an alkyl, haloalkyl, aralkyl, alkenyl, aryl, or aryl substituted with an alkyl, alkoxy, or halo. G is a q-valent residue unit equal to the formula $G(NHR^3)_q$ minus the $q$-$NHR^3$ groups, and q is an integer of 2 or greater. In certain embodiments q can, for example, be equal to 2, 3, or 4. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN$-G-$NHR^3$ is piperazine or the like). Each Y is independently an alkylene, aralkylene, or a combination thereof. D is an organic soft segment residue. Subscript n is independently an integer of 0 to 1500 and the subscript p is an integer of 1 to 10. Each asterisk (*) indicates a site of attachment of the repeat unit to another group in the copolymer.

Suitable alkyl groups for $R^1$ in Formula II typically have 1 to 10, 1 to 6, or 1 to 4 carbon atoms. Exemplary alkyl groups include, but are not limited to, methyl, ethyl, iso-propyl, n-propyl, n-butyl, and iso-butyl. Suitable haloalkyl groups for $R^1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for $R^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^1$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R^1$ usually have an alkylene group with 1 to 10 carbon atoms and an aryl group with 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

In some repeat units of Formula II, all $R^1$ groups can be one of alkyl, haloalkyl, aralkyl, alkenyl, aryl, or aryl substituted with an alkyl, alkoxy, or halo (e.g., all $R^1$ Groups are an alkyl such as methyl or an aryl such as phenyl). In some compounds of Formula II, the $R^1$ groups are mixtures of two or more selected from the group consisting of alkyl, haloalkyl, aralkyl, alkenyl, aryl, and aryl substituted with an alkyl, alkoxy, or halo in any ratio. Thus, for example, in certain compounds of Formula II, 0%, 1%, 2, %, 5%, 10%, 20%, 30%, 40%, 50%, 60%, 70%, 80%, 90%, 95%, 98%, 99%, or 100% of the $R^1$ groups can be methyl; and 100%, 99%, 98%, 95%, 90%, 80%, 70%, 60%, 50%, 40%, 30%, 20%, 10%, 5%, 2%, 1%, or 0% of the $R^1$ groups can be phenyl.

In some repeat units of Formula II at least 50 percent of the $R^1$ groups are methyl. For example, at least 60 percent, at least 70 percent, at least 80 percent, at least 90 percent, at least 95 percent, at least 98 percent, or at least 99 percent of the $R^1$ groups can be methyl. The remaining $R^1$ groups can be selected from an alkyl having at least two carbon atoms, haloalkyl, aralkyl, alkenyl, aryl, or aryl substituted with an alkyl, alkoxy, or halo.

Each Y in Formula II is independently an alkylene, aralkylene, or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group with 6 to 12 carbon atoms bonded to an alkylene group with 1 to 10 carbon atoms. In some exemplary aralkylene groups, the arylene portion is phenylene.

That is, the divalent aralkylene group is phenylene-alkylene where the phenylene is bonded to an alkylene having 1 to 10, 1 to 8, 1 to 6, or 1 to 4 carbon atoms. As used herein with reference to group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each subscript n in Formula II is independently an integer of 0 to 1500. For example, subscript n can be an integer up to 1000, up to 500, up to 400, up to 300, up to 200, up to 100, up to 80, up to 60, up to 40, up to 20, or up to 10. The value of n is often at least 1, at least 2, at least 3, at least 5, at least 10, at least 20, or at least 40. For example, subscript n can be in the range of 40 to 1500, 0 to 1000, 40 to 1000, 0 to 500, 1 to 500, 40 to 500, 1 to 400, 1 to 300, 1 to 200, 1 to 100, 1 to 80, 1 to 40, or 1 to 20.

The subscript p is an integer of 1 to 10. For example, the value of p is often an integer up to 9, up to 8, up to 7, up to 6, up to 5, up to 4, up to 3, or up to 2. The value of p can be in the range of 1 to 8, 1 to 6, or 1 to 4.

Group G in Formula II and/or Formula III is a residual unit that is equal to a diamine or polyamine compound of formula $G(NHR^3)_q$ minus the q amino groups (i.e., —$NHR^3$ groups), where q is an integer of 2 or greater. The diamine and/or polyamine can have primary and/or secondary amino groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3$HN-G-$NHR^3$ is piperazine). In most embodiments, $R^3$ is hydrogen or an alkyl. In many embodiments, all of the amino groups of the diamine and/or polyamine are primary amino groups (i.e., all the $R^3$ groups are hydrogen) and the diamine and/or polyamine are of the formula $G(NH_2)_q$ (e.g., a diamine of the formula $H_2$N-G-$NH_2$ when q=2).

In certain embodiments, Group G in Formula II and/or Formula III is a mixture of residual units that are equal to (i) a diamine compound of the formula $R^3$HN-G-$NHR^3$ minus the two amino groups (i.e., —$NHR^3$ groups) and (ii) a polyamine compound of the formula $G(NHR^3)_q$ minus the q amino groups (i.e., —$NHR^3$ groups), where q is an integer greater than 2. In such embodiments, the polyamine compound of formula $G(NHR^3)_q$ can be, but is not limited to, triamine compounds (i.e., q=3), tetraamine compounds (i.e., q=4), and combinations thereof. In such embodiments, the number of equivalents of polyamine (ii) per equivalent of diamine (i) is generally at least 0.001, more generally at least 0.005, and most generally at least 0.01. In such embodiments, the number of equivalents of polyamine (ii) per equivalent of diamine (i) is generally at most 3, more typically at most 2, and most typically at most 1.

When G includes residual units that are equal to (i) a diamine compound of formula $R^3$HN-G-$NHR^3$ minus the two amino groups (i.e., —$NHR^3$ groups), G can be an alkylene, heteroalkylene, polydiorganosiloxane, arylene, aralkylene, or a combination thereof. Suitable alkylenes often have 2 to 10, 2 to 6, or 2 to 4 carbon atoms. Exemplary alkylene groups include ethylene, propylene, butylene, and the like. Suitable heteroalkylenes are often polyoxyalkylenes such as polyoxyethylene having at least 2 ethylene units, polyoxypropylene having at least 2 propylene units, or copolymers thereof. Suitable polydiorganosiloxanes include the polydiorganosiloxane diamines of the formula:

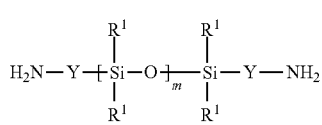

Formula VI where the groups $R^1$ and Y are the same as described above, and the subscript m is an integer greater than 1, minus the two amino groups. Exemplary polydiorganosiloxanes include, but are not limited to, polydimethylsiloxanes with alkylene Y groups. Suitable aralkylene groups usually contain an arylene group having 6 to 12 carbon atoms bonded to an alkylene group having 1 to 10 carbon atoms. Some exemplary aralkylene groups are phenylene-alkylene where the phenylene is bonded to an alkylene having 1 to 10 carbon atoms, 1 to 8 carbon atoms, 1 to 6 carbon atoms, or 1 to 4 carbon atoms. As used herein with reference to group G, "a combination thereof" refers to a combination of two or more groups selected from an alkylene, heteroalkylene, polydiorganosiloxane, arylene, and aralkylene. A combination can be, for example, an aralkylene bonded to an alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each D is Formula III represents an organic soft segment. Organic soft segments typically include one or more polyether residues such as, for example, polyoxyethylene residues, polyoxypropylene residues, poly(oxyethylene-co-oxypropylene) residues, and combinations thereof. The organic soft segment generally has a number average molecular weight of at least 450 g/mol, more generally at least 700 g/mol, and most generally at least 2000 g/mol. The organic soft segment generally has a number average molecular weight of at most 8000 g/mol, more generally at most 6000 g/mol, and most generally at most 4000 g/mol. A wide variety of organic soft segments can be used including, for example, those described in U.S. Pat. No. 4,119,615 (Schulze).

In some specific embodiments, the polydiorganosiloxane polyamide having amide end-capped (e.g., oxalated) organic soft segments is a polydiorganosiloxane polyoxamide. The polydiorganosiloxane polyamide tends to be free of groups having a formula —$R^a$—(CO)—NH— where $R^a$ is an alkylene. All of the carbonylamino groups along the backbone of the copolymeric material are part of an oxalylamino group (i.e., the —(CO)—(CO)—NH— group). That is, any carbonyl group along the backbone of the copolymeric material is bonded to another carbonyl group and is part of an oxalyl group. More specifically, the polydiorganosiloxane polyoxamide has a plurality of aminoxalylamino groups.

Some of the polydiorganosiloxane polyoxamides can be heated to a temperature up to 200° C., up to 225° C., up to 250° C., up to 275° C., or up to 300° C. without noticeable degradation of the material. For example, when heated in a thermogravimetric analyzer in the presence of air, the copolymers often have less than a 10 percent weight loss when scanned at a rate 50° C. per minute in the range of 20° C. to 350° C. Additionally, the copolymers can often be heated at a temperature such as 250° C. for 1 hour in air without apparent degradation as determined by no detectable loss of mechanical strength upon cooling.

The copolymeric material having repeat units of Formula II and Formula III can be optically clear. As used herein, the term "optically clear" refers to a material that is clear to the human eye. An optically clear copolymeric material often has a luminous transmission of at least 90 percent, a haze of less than 2 percent, and opacity of less than 1 percent in the 400 to 700 nm wavelength range. Both the luminous transmission and the haze can be determined using, for example, the method of ASTM-D 1003-95.

Additionally, the copolymeric material having repeat units of Formula II and Formula III can have a low refractive index. As used herein, the term "refractive index" refers to the absolute refractive index of a material (e.g., copolymeric material) and is the ratio of the speed of electromagnetic radiation in free space to the speed of the electromagnetic radiation in the material of interest. The electromagnetic radiation is white light. The index of refraction is measured using an Abbe refractometer, available commercially, for example, from Fisher Instruments of Pittsburgh, Pa. The measurement of the refractive index can depend, to some extent, on the particular refractometer used. For some embodiments (e.g., embodiments in which the copolymer includes a polydimethylsiloxane segment), the copolymeric material can have a refractive index in the range of 1.41 to 1.50. For some other embodiments (e.g., embodiments in which the copolymer includes a polyphenylsiloxane or a polydiphenylsiloxane segment), the copolymeric material can have a refractive index in the range of from 1.46 to 1.55.

The preparation of such polymers is described, for example in U.S. Pat. Nos. 8,063,166, 8,361,626, 8,623,988, and 9,018,331.

As was discussed above, an additional benefit of the blend compositions of this disclosure is that the polydiorganosiloxane polyoxamide copolymers, while thermally and UV stable have recently been found to depolymerize when exposed to UV radiation at or below the B spectral range. This depolymerization is described in detail in U.S. Patent Ser. No. 62/299,221 filed Feb. 24, 2016.

While the polydiorganosiloxane polyoxamide polymers have high thermal and environmental stability, it has been discovered that the oxamide linkages absorb ultraviolet radiation at wavelengths at or below the B spectral range. Upon absorption of the UV radiation, the oxamide linkage breaks, causing de-polymerization of the polydiorganosiloxane polyoxamide polymer.

Ultraviolet or UV radiation is a portion of the electromagnetic spectrum located in the wavelength region between visible light and X-ray radiation with wavelengths of from 400 nanometers (nm) to 100 nm. UV radiation is typically subdivided into regions that are described as UVA (315-400 nm), UVB (280-315 nm) and UVC (100-280). In nature, the long wavelength UVA light is not absorbed by the ozone layer, the medium wavelength UVB is mostly absorbed by the ozone layer, and the short wavelength UVC is completely absorbed by the ozone layer. Thus UVC and much of UVB radiation is not present in natural light.

The polydiorganosiloxane polyoxamide copolymers while transmissive of visible light and UVA radiation, absorb light in the range of 315 nm and below (the UVB and UVC wavelength range). The oxamide linkages in the polydiorganosiloxane polyoxamide copolymers is responsible for this absorbance, as similar siloxane polyurea copolymers do not demonstrate this absorbance behavior. A consequence of this absorbance is that when the polydiorganosiloxane polyoxamide copolymers are exposed to UV radiation at or below the B spectral range, the copolymers absorb the radiation and this absorption causes de-polymerization of the polydiorganosiloxane polyoxamide copolymers. At least one product of this de-polymerization is a siloxane fluid.

This unusual property of polydiorganosiloxane polyoxamide copolymers permits a wide range of formulation latitude in the use of the blend compositions of the present disclosure as a delivery system for silicone tackifying resins. When the blend compositions are added to a formulation, if the polydiorganosiloxane polyoxamide copolymer is not desired, the formulator can convert the polydiorganosiloxane polyoxamide copolymer to a siloxane fluid by exposing the formulation to UV radiation at or below the B spectral range. Also, if one merely wished to modify the polydiorganosiloxane polyoxamide copolymer present in the formulation, one can used controlled exposure to UV radiation at or below the B spectral range to effect the modification.

The blend composition also includes at least one silicone tackifying resin. These tackifying resins were formerly referred to as "silicate" tackifying resins. The silicone tackifying resin can influence the physical properties of the resulting adhesive composition. For example, as silicone tackifying resin content is increased, the glassy to rubbery transition of the adhesive composition occurs at increasingly higher temperatures. In some exemplary adhesive compositions, a plurality of silicone tackifying resins can be used to achieve desired performance.

Suitable silicone tackifying resins include those resins composed of the following structural units M (i.e., monovalent $R'_3SiO_{1/2}$ units), D (i.e., divalent $R'_2SiO_{2/2}$ units), T (i.e., trivalent $R'SiO_{3/2}$ units), and Q (i.e., quaternary $SiO_{4/2}$ units), and combinations thereof. Typical exemplary silicone resins include MQ silicone tackifying resins, MQD silicone tackifying resins, and MQT silicone tackifying resins. These silicone tackifying resins usually have a number average molecular weight in the range of 100 to 50,000 or in the range of 500 to 15,000 and generally have methyl R' groups.

MQ silicone tackifying resins are copolymeric resins having $R'_3SiO_{1/2}$ units ("M" units) and $SiO_{4/2}$ units ("Q" units), where the M units are bonded to the Q units, each of which is bonded to at least one other Q unit. Some of the $SiO_{4/2}$ units ("Q" units) are bonded to hydroxyl radicals resulting in $HOSiO_{3/2}$ units ("$T^{OH}$" units), thereby accounting for the silicon-bonded hydroxyl content of the silicone tackifying resin, and some are bonded only to other $SiO_{4/2}$ units.

Such resins are described in, for example, *Encyclopedia of Polymer Science and Engineering*, vol. 15, John Wiley & Sons, New York, (1989), pp. 265-270, and U.S. Pat. No. 2,676,182 (Daudt et al.), U.S. Pat. No. 3,627,851 (Brady), U.S. Pat. No. 3,772,247 (Flannigan), and U.S. Pat. No. 5,248,739 (Schmidt et al.). Other examples are disclosed in U.S. Pat. No. 5,082,706 (Tangney). The above-described resins are generally prepared in solvent. Dried or solventless, M silicone tackifying resins can be prepared, as described in U.S. Pat. No. 5,319,040 (Wengrovius et al.), U.S. Pat. No. 5,302,685 (Tsumura et al.), and U.S. Pat. No. 4,935,484 (Wolfgruber et al.).

Certain MQ silicone tackifying resins can be prepared by the silica hydrosol capping process described in U.S. Pat. No. 2,676,182 (Daudt et al.) as modified according to U.S. Pat. No. 3,627,851 (Brady), and U.S. Pat. No. 3,772,247 (Flannigan). These modified processes often include limiting the concentration of the sodium silicate solution, and/or the silicon-to-sodium ratio in the sodium silicate, and/or the time before capping the neutralized sodium silicate solution to generally lower values than those disclosed by Daudt et al. The neutralized silica hydrosol is often stabilized with an alcohol, such as 2-propanol, and capped with $R_3SiO_{1/2}$ siloxane units as soon as possible after being neutralized. The level of silicon bonded hydroxyl groups (i.e., silanol) on the MQ resin may be reduced to no greater than 1.5 weight percent, no greater than 1.2 weight percent, no greater than 1.0 weight percent, or no greater than 0.8 weight percent based on the weight of the silicone tackifying resin. This may be accomplished, for example, by reacting hexamethyldisilazane with the silicone tackifying resin. Such a reaction may be catalyzed, for example, with trifluoroacetic acid. Alternatively, trimethylchlorosilane or trimethylsilylacetamide may be reacted with the silicone tackifying resin, a catalyst not being necessary in this case.

MQD silicone tackifying resins are terpolymers having $R'_3SiO_{1/2}$ units ("M" units), $SiO_{4/2}$ units ("Q" units), and $R'_2SiO_{2/2}$ units ("D" units) such as are taught in U.S. Pat. No. 2,736,721 (Dexter). In MQD silicone tackifying resins, some of the methyl R' groups of the $R'_2SiO_{2/2}$ units ("D" units) can be replaced with vinyl ($CH_2=CH-$) groups ("$D^{Vi}$" units).

MQT silicone tackifying resins are terpolymers having $R'_3SiO_{1/2}$ units, $SiO_{4/2}$ units and $R'SiO_{3/2}$ units ("T" units) such as are taught in U.S. Pat. No. 5,110,890 (Butler) and Japanese Kokai HE 2-36234.

Suitable silicone tackifying resins are commercially available from sources such as Dow Corning, Midland, Mich., Momentive Performance Materials, Waterford, N.Y. and Bluestar Silicones, Rock Hill, S.C. Examples of particularly useful MQ silicone tackifying resins include those available under the trade designations SR-545 and SR-1000, both of which are commercially available from Momentive Performance Materials, Waterford, N.Y. Such resins are generally supplied in organic solvent and may be employed in the formulations of the adhesives of the present disclosure as received. Blends of two or more silicone resins can be included in the adhesive compositions.

The blend compositions comprise a relatively large amount of silicone tackifying resin. The blend compositions comprise at least 70% by weight silicone tackifying resin. The terms "% by weight" and "weight %" are used interchangeably and refer to the percentage of the total solid content of the composition.

In some embodiments, the weight % of silicone tackifying resin is even higher. In some embodiments, the silicone tackifying resin comprises 80% by weight of the blend composition, 85% by weight, or even 90% by weight. As mentioned above, a single silicone tackifying resin can be used or mixtures of silicone tackifying resins can be used.

The blend composition, besides the at least one polydiorganosiloxane polyoxamide copolymer and the at least one silicone tackifying resin, can contain additional additives if desired. A wide range of additional additives can be added in any desired quantity as long as they do not interfere with the desired properties of the blend composition. Examples of suitable additives include UV stabilizers, antioxidants, antimicrobials, fillers, UV sensitizers, enzymes, and oils (both silicone oils and non-silicone oils).

The blend compositions of this disclosure are in the form of solid particles. These solid particles can take a wide variety of forms depending upon the shape desired and the method used to form the blend composition. Among the useful forms are pellets, rods, flakes, ellipses, chips and powder crumbs. The solid particles may be regular or irregular in shape, and may have a variety of configurations such as pellets, rods, flakes, or crumbs. A wide variety of sizes for the particles of the solid blend compositions can be prepared, again depending upon the desired form and method used to form the blend composition. In some embodiments, it is desirable to form regularly shaped pellets of a size between 3 millimeters and 2 centimeters in size. In other embodiments, it is desirable to form irregularly shaped flakes with a range of sizes from 1 millimeter to 1 centimeter.

Regardless of the shape and size of the particles of the solid blend compositions, the blend compositions are non-tacky. Non-tackiness can be tested in a variety of ways. As used herein, the term "non-tacky" means that the blend composition, in whatever form or shape, has no finger tack, and does not agglomerate over time. By "finger tack" it is meant that when the surface of the composition, in whatever form, is touched with a finger, the surface does not feel tacky and upon removing the finger from the surface, the composition does not adhere to the finger. Non-tacky also means that pellets, rods, flakes, ellipses, chips or powder crumbs of the blend composition do not agglomerate over time and remain free-flowing. Thus a collection of pellets, rods, flakes, ellipses, chips or powder crumbs of the blend composition can be stored for a period of at least one month and will remain as discernable separate pellets, rods, flakes, ellipses, chips or powder crumbs and when dispensed are free-flowing. As was mentioned above, the free-flowing particles slide over one another easily and exhibit dust-free behavior and are non-blocking, non-caking and non-clumping.

A variety of different methods can be used to prepare the blend composition particles. In one aspect, the method comprises providing a polymeric composition comprising at least one polydiorganosiloxane polyoxamide copolymer, providing at least 70% by weight of at least one silicone tackifying resin, mixing the polymeric composition and the at least one silicone tackifying resin to form a blend composition, and forming the blend composition into a particle, wherein the blend composition particle is non-tacky at room temperature up to a temperature of at least 100° C.

In some embodiments, the mixing of the polymeric composition and the at least one silicone tackifying resin to form a blend composition comprises hot melt mixing. In these embodiments, the polydiorganosiloxane polyoxamide copolymer and the silicone tackifying resin are both solid materials and are added to a melt mixer or an extruder. As mentioned above, care must be exercised when solid silicone tackifying resin is used, as it is a finely divided powder and thus is an explosion hazard.

Examples of melt mixers that may be used to form the blend particles include those that provide dispersive mixing, distributive mixing, or a combination of dispersive and distributive mixing. Examples of batch methods include those using a BRABENDER (e.g. a BRABENDER PREP CENTER, commercially available from C.W. Brabender Instruments, Inc.; South Hackensack, N.J.) or BANBURY internal mixing and roll milling equipment (e.g. equipment available from Farrel Co.; Ansonia, Conn.). After batch mixing, the mixture created may be immediately quenched and stored below the melting temperature of the mixture for later processing.

Examples of continuous methods include single screw extruding, twin screw extruding, disk extruding, reciprocating single screw extruding, and pin barrel single screw extruding. The continuous methods can include utilizing both distributive elements, such as cavity transfer mixers (e.g. CTM, commercially available from RAPRA Technology, Ltd.; Shrewsbury, England) and pin mixing elements, static mixing elements or dispersive mixing elements (commercially available from e.g., MADDOCK mixing elements or SAXTON mixing elements).

In some embodiments, it may be desirable to use an extruder to form the blend composition, since the output from the extruder can be formed into the desired particles in a straightforward way using known techniques such as pelletizing. In this technique, the hot mixture is extruded through a die into a pelletizer. Typically, the pelletizer is water cooled so that the molten blend composition is rapidly cooled and cut into particles of the desired size and shape. In other embodiments, the output from the extruder may be a continuous strand which can then be cooled, and even in some instances be frozen, and broken up into particles. The particles formed this way tend to be more irregular in size and shape, such as flakes, powder crumbs, and the like.

In some embodiments, the method of pelletizing the blend composition comprises hot melt mixing the blend composition, forcing the blend composition through a die to form substantially homogeneous ribbons of the blend composition, forming pellets, and solidifying the pellets using a cooling medium.

In some embodiments, the mixing of the polymeric composition and the at least one silicone tackifying resin to form a blend composition comprises solvent mixing. In these embodiments, the method further comprises adding at least one solvent to the polymeric composition, the silicone tackifying resin, or both, and forming the blend composition into an article further comprises drying the formed article. This method has the disadvantages of using solvent which needs to be added and then removed, but it has the advantage of allowing the use of solvent-borne silicone tackifying resin. As was mentioned above, a number of commercial suppliers of silicone tackifying resins supply them as solutions. While this precludes their use in hot melt applications unless they are dried first, it facilitates their use in solvent mixing methods. In this method, typically the polydiorganosiloxane polyoxamide polymer is dissolved in a solvent and the silicone tackifying resin is added to it. As mentioned above, the silicone tackifying resin is generally a solution but solid silicone tackifying resin could be used as well if desired. The resultant mixture is stirred and the blend composition solution can then be dried to form a blend composition that could be formed into particles using hot melt processing as described above. While such a process could be used, drying the blend composition prior to forming the desired particles is not an efficient process. More desirable are processes in which the particles are formed directly from the blend solution, such as spray drying techniques in which the solution is passed through a nozzle which forms the solution into small droplets which travel through the air and dry or partially dry as they are in flight. The dried droplets are particles of the blend, and may be in a variety of shapes and forms such as flakes or ellipses, and can take a variety of sizes depending upon the processing conditions. If the droplets only partially dry in flight, they can be fully dried upon collection of the particles.

A wide variety of solvents are useful to form the solutions of this disclosure. Mixtures of solvents are also useful. Examples of suitable solvents include hydrocarbon solvents, including aliphatic solvents such as hexane, heptane, and petroleum ether, and aromatic solvents such as benzene, toluene, and xylenes; ethers such as THF (tetrahydrofuran); halocarbon solvents such as methylene chloride, and chloroform; acetates such as ethyl acetate; alcohols such as isopropyl alcohol (IPA) and isoamyl alcohol; and ketones such as acetone and MEK (methyl ethyl ketone).

A variation on the solvent-borne method is one in which the polydiorganosiloxane polyoxamide copolymer is not dissolved in a solvent, rather a reactive composition that upon reaction forms a polydiorganosiloxane polyoxamide copolymer is used. This reactive composition can be blended with the silicone tackifying agent and the resulting mixture and the reactive composition can be cured to form the polydiorganosiloxane polyoxamide copolymer. The term "curing" is sometimes used to refer to crosslinking of a composition, but in this context it merely refers to polymerization of the reactive composition.

The reactive composition may include a wide range of combinations of reactive compounds. In some embodiments, the combination includes a precursor of Formula IV and a polyamine of formula $G(NHR^3)_q$.

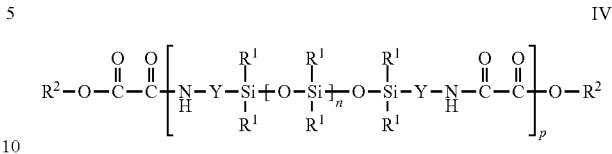

IV

In Formula IV, each $R^1$ is independently an alkyl, haloalkyl, aralkyl, alkenyl, aryl, or aryl substituted with an alkyl, alkoxy, or halo; each Y is independently an alkylene, aralkylene, or a combination thereof; the subscript n is an integer of 0 to 1500; the subscript p is an integer of 1 to 10; and each $R^2$ group is independently an alkyl, haloalkyl, aralkyl, substituted aralkyl, alkenyl, aryl, substituted aryl, or imino of formula $—N=CR^4R^5$, where each $R^4$ is hydrogen, alkyl, aralkyl, substituted aralkyl, aryl, or substituted aryl. Each $R^5$ is an alkyl, aralkyl, substituted aralkyl, aryl, or substituted aryl.

Suitable alkyl groups for $R^1$ in Formula IV typically have 1 to 10, 1 to 6, or 1 to 4 carbon atoms. Exemplary alkyl groups include, but are not limited to, methyl, ethyl, isopropyl, n-propyl, n-butyl, and iso-butyl. Suitable haloalkyl groups for $R^1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for $R^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^1$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R^1$ usually have an alkylene group with 1 to 10 carbon atoms and an aryl group with 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

Each Y in Formula IV is independently an alkylene, aralkylene, or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group with 6 to 12 carbon atoms bonded to an alkylene group with 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each subscript n in Formula I is independently an integer of 0 to 1500. For example, subscript n can be an integer up to 1000, up to 500, up to 400, up to 300, up to 200, up to 100, up to 80, up to 60, up to 40, up to 20, or up to 10. The value of n is often at least 1, at least 2, at least 3, at least 5, at least 10, at least 20, or at least 40. For example, subscript n can be in the range of 40 to 1500, 0 to 1000, 40 to 1000, 0 to 500, 1 to 500, 40 to 500, 1 to 400, 1 to 300, 1 to 200, 1 to 100, 1 to 80, 1 to 40, 1 to 20, 1 to 10, or 0 to 10.

The subscript p is an integer of 1 to 10. For example, the value of p is often an integer up to 9, up to 8, up to 7, up to 6, up to 5, up to 4, up to 3, or up to 2. The value of p can be in the range of 1 to 8, 1 to 6, or 1 to 4.

Group G in the polyamine of formula $G(NHR^3)_q$ is a residual unit that is equal to a diamine or polyamine compound of formula $G(NHR^3)_q$ minus the q amino groups (i.e., —$NHR^3$ groups), where q is an integer of 2 or greater. The diamine and/or polyamine can have primary and/or secondary amino groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3$HN-G-$NHR^3$ is piperazine). In most embodiments, $R^3$ is hydrogen or an alkyl. In many embodiments, all of the amino groups of the diamine and/or polyamine are primary amino groups (i.e., all the $R^3$ groups are hydrogen) and the diamine and/or polyamine are of the formula $G(NH2)_q$ (e.g., a diamine of the formula H2N-G-NH2 when q=2).

In some embodiments, all of the q groups are 2, and thus the polyamines are all diamines. In these embodiments, the formed polydiorganosiloxane polyoxamide is of Formula I. In other embodiments, at least some the q groups are greater than 2, and the formed polydiorganosiloxane polyoxamide is of Formula II or a combination of Formula II and Formula III. The amounts and descriptions of the materials used are discussed in detail above.

The reaction between the precursor of Formula IV and the diamine and/or polyamine is a spontaneous and rapid reaction, therefore it may be desirable to add the reactants to a solution comprising the silicone tackifying resin. For example a solution of the precursor of Formula IV could be added to a solution of the silicone tackifying resin and then a solution of diamine and/or polyamine could be added to this mixture.

In other embodiments, the reactive mixture can include a precursor of Formula V and a polydiorganosiloxane diamine of Formula VI

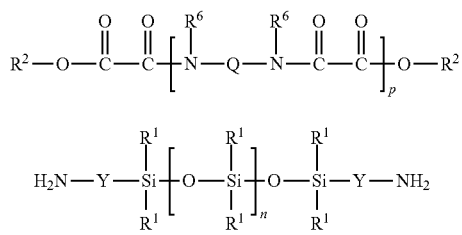

In Formula V, each $R^2$ group is independently an alkyl, haloalkyl, aralkyl, substituted aralkyl, alkenyl, aryl, substituted aryl, or imino of formula —N=$CR^4R^5$, where each $R^4$ is hydrogen, alkyl, aralkyl, substituted aralkyl, aryl, or substituted aryl, and each $R^5$ is an alkyl, aralkyl, substituted aralkyl, aryl, or substituted aryl. Each $R^6$ is independently hydrogen, alkyl, aralkyl, aryl, or part of a heterocyclic group that includes Q and the nitrogen to which $R^6$ is attached (the nitrogen is the heteroatom of the heterocyclic group). Group Q is (a) an alkylene, (b) arylene, (c) a carbonylamino group linking a first group to a second group, wherein the first group and the second group are each independently an alkylene, arylene, or a combination thereof, (d) part of a heterocyclic group that includes $R^6$ and the nitrogen to which $R^6$ is attached, or (e) a combination thereof. The group Q is typically not a polydiorganosiloxane group. The variable p is an integer of 1-10.

Suitable alkyl and haloalkyl groups for $R^2$ often have 1 to 10, 1 to 6, or 1 to 4 carbon atoms. Although tertiary alkyl (e.g., tert-butyl) and tertiary haloalkyl groups can be used, a primary or secondary carbon atom is often attached directly (i.e., bonded) to the adjacent oxy group. Exemplary alkyl groups include methyl, ethyl, n-propyl, iso-propyl, n-butyl, and iso-butyl. Exemplary haloalkyl groups include chloroalkyl groups and fluoroalkyl groups in which some, but not all, of the hydrogen atoms on the corresponding alkyl group are replaced with halo atoms. For example, the chloroalkyl or fluoroalkyl groups can be 2-chloroethyl, 2,2,2-trichloroethyl, 3-chloropropyl, 4-chlorobutyl, fluoromethyl, 2-fluoroethyl, 2,2-difluoroethyl, 2,2,2-trifluoroethyl, 1-(trifluoromethyl)-2,2,2-trifluoroethyl, 3-fluoropropyl, 4-fluorobutyl, and the like.

Suitable alkenyl groups for $R^2$ often have 2 to 10, 2 to 8, 2 to 6, or 2 to 4 carbon atoms. Exemplary alkenyl groups include ethenyl, propenyl, butenyl, and pentenyl.

Suitable aryl groups for $R^2$ include those having 6 to 12 carbon atoms such as, for example, phenyl. The aryl can be unsubstituted or substituted with an alkyl (e.g., an alkyl having 1 to 4 carbon atoms such as methyl, ethyl, or n-propyl), an alkoxy (e.g., an alkoxy having 1 to 4 carbon atoms such as methoxy, ethoxy, or propoxy), halo (e.g., chloro, bromo, or fluoro), a haloalkyl (e.g., a haloalkyl having 1 to 4 carbon atoms such as trifluoromethyl), or alkoxycarbonyl (e.g., an alkoxycarbonyl having 2 to 5 carbon atoms such as methoxycarbonyl, ethoxycarbonyl, or propoxycarbonyl).

Suitable aralkyl groups for $R^2$ include those having an alkyl group with 1 to 10 carbon atoms and an aryl group with 6 to 12 carbon atoms. For example, the aralkyl can be an alkyl having 1 to 10 carbon atoms or 1 to 4 carbon atoms substituted with phenyl. The aryl portion of the aralkyl can be unsubstituted or substituted with an alkyl (e.g., an alkyl having 1 to 4 carbon atoms such as methyl, ethyl, or n-propyl), an alkoxy (e.g., an alkoxy having 1 to 4 carbon atoms such as methoxy, ethoxy, or propoxy), halo (e.g., chloro, bromo, or fluoro), a haloalkyl (e.g., a haloalkyl having 1 to 4 carbon atoms such as trifluoromethyl), or alkoxycarbonyl (e.g., an alkoxycarbonyl having 2 to 5 carbon atoms such as methoxycarbonyl, ethoxycarbonyl, or propoxycarbonyl).

Suitable imino groups for $R^2$ are monovalent groups of formula —N=$CR^4R^5$. Suitable alkyl groups for either $R^4$ or $R^5$ can be linear or branched and typically contain 1 to 10 carbon atoms, 1 to 8 carbon atoms, 1 to 6 carbon atoms, or 1 to 4 carbon atoms. Suitable aryl, substituted aryl, aralkyl, and substituted aralkyl groups for $R^4$ or $R^5$ are the same as those describe above for $R^2$.

Each $R^6$ group in Formula (I) independently can be hydrogen, alkyl, aralkyl, aryl, or part of a heterocyclic group that includes Q and the nitrogen to which $R^6$ is attached. Suitable alkyl groups can be linear or branched and typically contain 1 to 10 carbon atoms, 1 to 8 carbon atoms, 1 to 6 carbon atoms, or 1 to 4 carbon atoms. Suitable aryl groups typically include those having 6 to 12 carbon atoms. The aryl group is often phenyl. Suitable aralkyl groups include those having an alkyl group with 1 to 10 carbon atoms substituted with an aryl group having 6 to 12 carbon atoms. Exemplary aralkyl groups often include an alkyl having 1 to 10 carbon atoms or 1 to 4 carbon atoms substituted with a phenyl. When $R^6$ is part of a heterocyclic group that includes Q and the nitrogen to which $R^6$ is attached, the heterocyclic group typically is saturated or partially saturated and contains at least 4, at least 5, or at least 6 ring members.

In the polydiorganosiloxane diamine of Formula VI, the groups $R^1$, Y and n are as are described above.

In these embodiments, the formed polydiorganosiloxane polyoxamide is of Formula I. The amounts and descriptions of the materials used are discussed in detail above. As was stated above, the reaction between the precursor of Formula V and the diamine of Formula VI is a spontaneous and rapid reaction, therefore it may be desirable to add the reactants to a solution of the silicone tackifying resin. For example a solution of the precursor of Formula V could be added to a solution of the silicone tackifying resin and then a solution of the diamine of Formula VI could be added to this mixture.

In the embodiments where a reactive mixture is utilized, once the polydiorganosiloxane polyoxamide copolymer is formed, the remaining steps are the same as if a solution of a pre-formed polydiorganosiloxane polyoxamide copolymer were used.

As was mentioned above, regardless of the method used to form the blend composition and the blend composition particles, the resulting blend particles comprise pellets, rods, flakes, ellipses, chips or powder crumbs that are non-tacky up to a temperature of at least 100° C.

Also disclosed are methods of using the blend compositions described above. As mentioned previously, the blend compositions can be used as a delivery system for solid silicone tackifying resin. In this way, the solid silicone tackifying resin is not a finely divided powder and thus the potential of its being an explosion hazard is removed. Additionally, the solid blend compositions, in whatever form they are used are easier to transport and dispense as they are not easily spilled.

The method of using the blend composition comprises providing the blend composition as described above, providing a second polymeric composition comprising at least one polydiorganosiloxane polymer or copolymer, or a reactive composition that upon reaction forms a polydiorganosiloxane polymer or copolymer, and mixing the blend composition with the second polymeric composition to form a second blend composition, wherein the second blend composition comprises less than 70% by weight of the at least one silicone tackifying resin.

As with the preparation of the blend composition, the mixing of the blend composition with the second polymeric composition can be carried out in a variety of ways. In some embodiments, the mixing comprises hot melt mixing. In these embodiments, the blend composition and the second polymeric composition are added to a melt mixer or an extruder.

Examples of melt mixers that may be used to form the blend particles include those that provide dispersive mixing, distributive mixing, or a combination of dispersive and distributive mixing. Examples of batch methods include those using a BRABENDER (e.g. a BRABENDER PREP CENTER, commercially available from C.W. Brabender Instruments, Inc.; South Hackensack, N.J.) or BANBURY internal mixing and roll milling equipment (e.g. equipment available from Farrel Co.; Ansonia, Conn.). After batch mixing, the mixture created may be immediately quenched and stored below the melting temperature of the mixture for later processing.

Examples of continuous methods include single screw extruding, twin screw extruding, disk extruding, reciprocating single screw extruding, and pin barrel single screw extruding. The continuous methods can include utilizing both distributive elements, such as cavity transfer mixers (e.g. CTM, commercially available from RAPRA Technology, Ltd.; Shrewsbury, England) and pin mixing elements, static mixing elements or dispersive mixing elements (commercially available from e.g., MADDOCK mixing elements or SAXTON mixing elements).

In other embodiments, the mixing comprises solvent mixing. In these embodiments, the method further comprises dissolving the blend composition in at least one solvent, dissolving the second polymeric composition in at least one solvent, or both; and also further comprises drying the second blend composition. Thus, in some embodiments the blend composition is dissolved in a solvent and the solid second polymeric composition is added to it. In other embodiments, the second polymeric composition is dissolved in a solvent and the solid blend composition is added to it. In yet other embodiments, both the blend composition and the second polymeric composition are dissolved in a solvent or solvents and the two solutions are mixed.

A wide variety of solvents are useful to form the solutions of this disclosure. Mixtures of solvents are also useful. Examples of suitable solvents include hydrocarbon solvents, including aliphatic solvents such as hexane, heptane, and petroleum ether, and aromatic solvents such as benzene, toluene, and xylenes; ethers such as THF (tetrahydrofuran); halocarbon solvents such as methylene chloride, and chloroform; acetates such as ethyl acetate; alcohols such as isopropyl alcohol (IPA) and isoamyl alcohol; and ketones such as acetone and MEK (methyl ethyl ketone).

The solution containing the mixture of second blend composition (the blend composition and the second polymeric composition) can be coated onto a wide range of substrate surfaces to form coatings and then be dried to a layer of the second blend composition. A number of conventional coating techniques are suitable, such as knife coating, roll coating, gravure coating, rod coating, curtain coating, air knife coating or printing techniques such as screen printing or inkjet printing. The coating may be of a wide range of thicknesses, and may be continuous or discontinuous. Drying of the coating may be carried out in a variety of ways. The coatings can simply be allowed to dry in the air or the drying can be accelerated through the application of heat, for example by the use of a heat lamp or through the use of an oven, as is well understood in the art.

A wide variety of substrates are suitable for use in this disclosure. The substrate may be a rigid substrate or a non-rigid substrate. Examples of rigid substrates include glass plates, relatively thick polymeric plates such as polymethyl methacrylate (PMMA) plates and polycarbonate (PC) plates, and the exterior surface of a device.

Examples of suitable non-rigid substrates include polymeric films, nonwoven films, metal foils, and the like. Examples of polymeric films include films comprising one or more polymers such as cellulose acetate butyrate; cellulose acetate propionate; cellulose triacetate; poly(meth)acrylates such as polymethyl methacrylate; polyesters such as polyethylene terephthalate, and polyethylene naphthalate; copolymers or blends based on naphthalene dicarboxylic acids; polyether sulfones; polyurethanes; polycarbonates; polyvinyl chloride; syndiotactic polystyrene; cyclic olefin copolymers; and polyolefins including polyethylene and polypropylene such as cast and biaxially oriented polypropylene. The substrate may comprise single or multiple layers, such as polyethylene-coated polyethylene terephthalate. The substrate may be primed or treated to impart some desired property to one or more of its surfaces. Examples of such treatments include corona, flame, plasma and chemical treatments.

One suitable class of film substrates are optical films. As used herein, the term "optical film" refers to a film that can be used to produce an optical effect. The optical films are typically polymer-containing films that can be a single layer or multiple layers. The optical films can be of any suitable thickness. The optical films often are at least partially transmissive, reflective, antireflective, polarizing, optically clear, or diffusive with respect to some wavelengths of the electromagnetic spectrum (e.g., wavelengths in the visible ultraviolet, or infrared regions of the electromagnetic spectrum). Exemplary optical films include, but are not limited to, visible mirror films, color mirror films, solar reflective films, diffusive films, infrared reflective films, ultraviolet reflective films, reflective polarizer films such as brightness enhancement films and dual brightness enhancement films, absorptive polarizer films, optically clear films, tinted films, dyed films, privacy films such as light-collimating films, and antireflective films, antiglare films, soil resistant films, and anti-fingerprint films.

Some optical films have multiple layers such as multiple layers of polymer-containing materials (e.g., polymers with or without dyes) or multiple layers of metal-containing material and polymeric materials. Some optical films have alternating layers of polymeric material with different refractive indices. Other optical films have alternating polymeric layers and metal-containing layers. Exemplary optical films are described in the following patents: U.S. Pat. No. 6,049,419 (Wheatley et al.); U.S. Pat. No. 5,223,465 (Wheatley et al.); U.S. Pat. No. 5,882,774 (Jonza et al.); U.S. Pat. No. 6,049,419 (Wheatley et al.); U.S. Pat. No. RE 34,605 (Schrenk et al.); U.S. Pat. No. 5,579,162 (Bjornard et al.), and U.S. Pat. No. 5,360,659 (Arends et al.).

A wide range of siloxane polymers are suitable for use as the second polymeric composition. In some embodiments, the second polymeric composition comprises at least one polydiorganosiloxane polyoxamide copolymer. The polydiorganosiloxane polyoxamide copolymer may be any of the copolymers described above by Formulas I-IV. Also the polydiorganosiloxane polyoxamide copolymer may be same or similar to the polydiorganosiloxane polyoxamide copolymer used to prepare the blend composition, or it may be different.

Another class of closely related siloxane copolymers are polydiorganosiloxane polyurea copolymers. These polymers are very similar to the polydiorganosiloxane polyoxamide copolymers, except that they include urea linkages instead of polyoxamide linkages. These copolymers are described in, for example, U.S. Pat. No. 5,214,119 (Leir et al.).

Other siloxane polymers and copolymers that are suitable include a wide range of siloxane-based copolymers. These siloxane-based copolymers are generally elastomeric polymeric matrices and can be prepared from a hydroxyl-functional polysiloxane, a hydride-functional polysiloxane, an alkoxysilane-functional polysiloxane, a vinyl-functional polysiloxane, an allyl-functional polysiloxane, a (meth)acrylate-functional polysiloxane, a non-functional polysiloxane or a combination thereof. Generally, the elastomeric siloxane polymer is prepared from a linear material described by Formula VII below, illustrating a siloxane backbone with aliphatic and/or aromatic substituents:

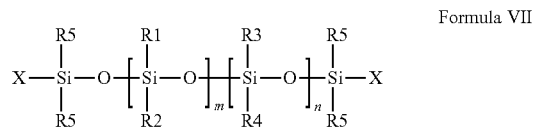

Formula VII wherein R1, R2, R3, and R4 are independently selected from the group consisting of an alkyl group, an aryl group and a functional group, each R5 is an alkyl group, each X is a functional or non-functional group, and n and m are integers, and at least one of m or n is not zero. In some embodiments, one or more of the alkyl or aryl groups may contain a halogen substituent, e.g., fluorine. For example, in some embodiments, one or more of the alkyl groups may be $-CH_2CH_2C_4F_9$.

When Formula VII is a hydroxyl-functional polysiloxane X is —OH; when Formula VII is a hydride-functional polysiloxane X is —H; when Formula VII is an alkoxysilane-functional polysiloxane X is —OR and one or more R5 groups may additionally be an —OR group, where R is an alkyl or aryl group; when Formula VII is a vinyl-functional polysiloxane X is a vinyl group (—HC=CH2); when Formula VII is an allyl-functional polysiloxane X is an allyl group (—CH2-CH=CH2); when Formula VII is a (meth)acrylate-functional polysiloxane X is a (meth)acrylate group of the general formula (—(CO)CR=CH$_2$), where (CO) is a carbonyl group C=O, and R is an H or a methyl group); when Formula VII is a non-functional polysiloxane, X is an R5 group.

The polysiloxanes of Formula VII can be used to prepare a wide range of elastomeric siloxane polymers. Hydroxyl-functional polysiloxanes can be used to prepare urethane-based siloxane copolymers. Alkoxy-functional polysiloxanes can be moisture cured to form elastomeric siloxane polymers. Hydride-functional polysiloxanes can be co-reacted with vinyl-functional polysiloxanes to form elastomeric siloxane polymers. Additionally, vinyl-functional polysiloxanes, allyl-functional polysiloxanes, and (meth) acrylate-functional polysiloxanes can be cured individually or together by free radical polymerization to form elastomeric siloxane matrices.

Another example of a useful class of elastomeric siloxane polymers is urethane-based siloxane polymers such as siloxane polyurea-urethane block copolymers. Siloxane polyurea-urethane block copolymers include the reaction product of a polydiorganosiloxane diamine (also referred to as siloxane diamine), a diisocyanate, and an organic polyol. Examples are such polymers are presented, for example, in U.S. Pat. No. 5,214,119 (Leir et al.).

These urethane-based siloxane polymers are prepared in the same fashion as the urea-based siloxane polymers except that an organic polyol is substituted for an organic polyamine. Typically, since the reaction between an alcohol group and an isocyanate group is slower than the reaction between a amine group and an isocyanate group, a catalyst such as a tin catalyst commonly used in polyurethane chemistry, is used.

Another useful class of elastomeric siloxane polymers can be prepared by moisture curing of alkoxy-functional polysiloxanes. As mentioned above, only the X group of Formula VII may be an alkoxy group, or one or both of the R5 groups may also be alkoxy groups. Examples of suitable —SiR5R5X units include trimethoxy silyl, dimethyl methoxy silyl, triethoxy silyl, methyl diethoxy silyl, and the like. These silyl alkoxy groups are subject to hydrolysis (that is to say they readily react with water) to form silanol groups such as for example —SiR5R5(OH). These silanol units can then further condense with other silanol units to siloxane linkages (—Si—O—Si—) and generate water.

Typically the moisture curing reaction is facilitated by a catalyst. Examples of suitable curing catalysts for this moisture curing reaction include alkyl tin derivatives (e.g., dibutyltindilaurate, dibutyltindiacetate, and dibutyltindioctoate commercially available as "T-series Catalysts" from Air Products and Chemicals, Inc. of Allentown, Pa.), and alkyl titanates (e.g., tetraisobutylorthotitanate, titanium acetylacetonate, and acetoacetic ester titanate commercially available from DuPont under the designation "TYZOR"). Other catalysts useful for the moisture curing reaction include acids, anhydrides, and lower alkyl ammonium salts thereof which include but are not limited to those selected from the group consisting of trichloroacetic acid, cyanoacetic acid, malonic acid, nitroacetic acid, dichloroacetic acid, difluoroacetic acid, trichloroacetic anhydride, dichloroacetic anhydride, difluoroacetic anhydride, triethylammonium trichloroacetate, trimethylammonium trichloroacetate, and mixtures thereof.

Examples of elastomeric siloxane polymers are described in U.S. Pat. No. 6,407,195 (Sherman et al.).

Yet another curing mechanism that can be used to prepare elastomeric siloxane polymers is the addition reaction (typically catalyzed by a metal catalyst such a platinum) between a vinyl group (—CH=CH$_2$) and a silyl hydride (—Si—H) group. In this reaction, the Si—H adds across the double bond to form new C—H and Si—C bonds. This process in described, for example, in PCT Publication No. WO 2000/068336 (Ko et al.), and PCT Publication Nos. WO 2004/111151 and WO 2006/003853 (Nakamura).

Additionally, elastomeric siloxane polymers can be prepared by the free radical polymerization of ethylenically unsaturated siloxanes such as (meth)acrylate functional siloxanes and/or vinyl-functional or allyl-functional siloxanes. (Meth)acrylate-functional siloxanes can be prepared by, for example, the reaction of amine-functional siloxanes with isocyanate-functional (meth)acrylates. Typically, the (meth)acrylate-functional siloxane is co-polymerized with additional free radically polymerized monomers to form elastomeric siloxane polymers suitable for use as pressure sensitive adhesives. The free radical polymerization can be carried out under a variety of conditions using a variety of different types of free radical initiators. Photoinitiators have been found to be particularly suitable as describe in U.S. Pat. No. 5,514,730 (Mazurek).

Recently, gentle to skin adhesives have been described in US Patent Publication No. 2011/0212325 (Determan et al.) that can be prepared from non-functionalized polysiloxane materials. These materials are ones described by Formula VII with X=R5, and ones described by Formula VII where X=OH. The materials where X=OH are considered to be "Non-functionalized materials" because the hydroxyl groups are not used as "functional groups", that is to say that the polymerization reaction does not involve reaction with the hydroxyl groups. These "non-functional materials" have been found to polymerize upon exposure to electron beam or gamma radiation to generate siloxane networks. In addition to the non-functionalized polysiloxane materials (where X=R5 or OH), the functionalized polysiloxane materials described above can also be polymerized in this way to generate siloxane networks. In other words, this polymerization method is very general and has the advantage of not requiring catalysts or initiators.

In some embodiments of the gentle to skin adhesives, each X and R5 comprises a methyl group, i.e., the nonfunctionalized polydiorganosiloxane material is terminated by trimethylsiloxy groups. In other embodiments, each R5 is a methyl and each X is a hydroxyl, such that the nonfunctionalized poly diorganosiloxane material is terminated by dimethylsilanol groups. In some embodiments, R1 and R2 are alkyl groups and n is zero, i.e., the material is a poly(dialkylsiloxane). In some embodiments, the alkyl group is a methyl group, i.e., poly(dimethylsiloxane) ("PDMS"). In some embodiments, R1 is an alkyl group, R2 is an aryl group, and n is zero, i.e., the material is a poly(alkylarylsiloxane). In some embodiments, R1 is methyl group and R2 is a phenyl group, i.e., the material is poly (methylphenylsiloxane). In some embodiments, R1 and R2 are alkyl groups and R3 and R4 are aryl groups, i.e., the material is a poly(dialkyldiarylsiloxane). In some embodiments, R1 and R2 are methyl groups, and R3 and R4 are phenyl groups, i.e., the material is poly(dimethyldiphenylsiloxane).

In some embodiments, the nonfunctionalized polydiorganosiloxane materials may be branched. For example, one or more of the R1, R2, R3, and/or R4 groups may be a linear or branched siloxane with alkyl or aryl (including halogenated alkyl or aryl) substituents and terminal R5 groups.

As used herein, "nonfunctional groups" are either alkyl or aryl groups consisting of carbon, hydrogen, and in some embodiments, halogen (e.g., fluorine) atoms, or hydroxyl groups that are not involved with the polymerization reaction. As used herein, a "nonfunctionalized poly diorganosiloxane material" is one in which the R1, R2, R3, R4, R5, and X groups are nonfunctional groups.

The nonfunctionalized poly diorganosiloxane materials are cured to elastomeric siloxane networks by exposure to an electron beam (E-beam), gamma radiation, or a combination thereof. This process is described in greater detail below.

However the elastomeric siloxane polymers are prepared, they may be mixed with the blend compositions described above (polydiorganosiloxane polyoxamide/silicone tackifying resin blends) to form a second blend composition.

Additionally, besides mixing the blend composition with a second siloxane polymeric composition to form the second blend composition, the second blend composition can be formed by mixing the blend composition with a reactive composition that upon reaction forms a siloxane polymer. Typically the reactive compositions used to prepare the second blend composition are polydiorganosiloxane fluids which upon exposure to an electron beam or to gamma radiation forms a polydiorganosiloxane polymer. These materials are ones described by Formula VII with X=R5, and ones described by Formula VII where X=OH. The materials where X=OH are considered to be "Non-functionalized materials" because the hydroxyl groups are not used as "functional groups", that is to say that the polymerization reaction does not involve reaction with the hydroxyl groups. These "non-functional materials" have been found to polymerize upon exposure to electron beam or gamma radiation generate siloxane networks. The use of non-functional siloxane materials to form the reactive composition is desirable because the composition does not begin to react until activated by an electron beam or gamma radiation. Thus the mixture of the blend composition and a reactive composition is stable for extended periods of time until activated. In this way the second blend composition can be coated onto a substrate as a 100% solids composition (no solvent) since the siloxane fluid can act as a solvent, and the coating can then be exposed to an electron beam or gamma radiation to cure the siloxane fluid. In other embodiments it may be desirable to cure the siloxane fluid prior to coating.

The second blend composition, besides the at least one polydiorganosiloxane polyoxamide copolymer, the at least one silicone tackifying resin, and the second polymeric composition, can contain additional additives if desired. A wide range of additional additives can be added in any desired quantity as long as they do not interfere with the desired properties of the blend composition. Examples of suitable additives include UV stabilizers, antioxidants, antimicrobials, fillers, UV sensitizers, enzymes, and oils (both silicone oils and non-silicone oils).

The second blend composition can have a wide range of properties and uses. One particularly useful embodiment is where the second blend composition comprises a pressure sensitive adhesive. Pressure sensitive adhesives are well known and understood in the art and have found an increasingly wide range of uses. Typically siloxane-based pressure sensitive adhesives have a relatively high level of silicone tackifying resin, often as high as 50% by weight or even higher. In many embodiments, pressure sensitive adhesives of the present disclosure have up to, but not including, 70% by weight of silicone tackifying resin based upon the total weight of the formulation. Again, this demonstrates how surprising it is that the blend compositions which contain at least 70% by weight of silicone tackifying resin are non-tacky, not only at room temperature but up to 100° C., since pressure sensitive adhesives are permanently and aggressively tacky at room temperature.

Another class of adhesives that can be prepared from the second blend compositions are heat activated adhesives. These adhesives are very similar to pressure sensitive adhesives, except they are not tacky at room temperature, they required the application of heat to become tacky. Typically, heat activated adhesives are heated to a temperature of less than 100° C., often much less such as 40° C. or 50° C. Thus, since the original blend compositions of this disclosure cannot be classified as heat activated adhesives since they are non-tacky up to a temperature of 100° C.

Besides pressure sensitive adhesives and heat activated adhesives, the second blend compositions can be useful as a wide range of uses that do not require tackiness. These uses include non-tacky coating layers as well as uses such as caulks and sealants where the composition is used as more than a coating. Typically, these non-tacky compositions have a lower level of silicone tackifying resin, i.e. less than 50% by weight, often much less than 50% by weight. In these applications, the silicone tackifying resin serves to modify the properties of the siloxane-based polymer network, without making the polymer network tacky. Among the useful coating layers are protective coating layers.

Another common use for silicones, including silicone tackifying resins, are cosmetic and personal care formulations. A summary of MQ resin uses in personal care applications are described, for example in "Personal Care July 2014 pages 50-55". Among the uses are shampoos, foundation, lip gloss, sunscreen, moisturizers, antiperspirants, eye shadow, and the like. Frequently, the silicone tackifying resins are used together with siloxane fluids. The blend compositions of this disclosure can be used not only to deliver the silicone tackifying resins to the compositions, but in some embodiments, the polydiorganosiloxane polyoxamide copolymer delivery agent may be a useful polymeric component in personal care compositions. If, on the other hand, the polydiorganosiloxane polyoxamide copolymer is not desired in the personal care formulation, as was described above, the polydiorganosiloxane polyoxamide copolymers can be exposed to UV radiation at or below the B spectral range, and depolymerized to form a siloxane fluid. Therefore the blend compositions of the present disclosure have wide formulation latitude for use in personal care applications.

This disclosure includes the following embodiments:

Among the embodiments are blend compositions. Embodiment 1 includes a blend composition comprising: a polymeric composition comprising at least one polydiorganosiloxane polyoxamide copolymer; and at least 70% by weight of at least one silicone tackifying resin, wherein the blend composition is non-tacky at room temperature up to a temperature of at least 100° C.

Embodiment 2 is the blend composition of embodiment 1, wherein the at least one polydiorganosiloxane polyoxamide block copolymer comprises a linear copolymer that contains at least two repeat units of Formula I:

Formula I

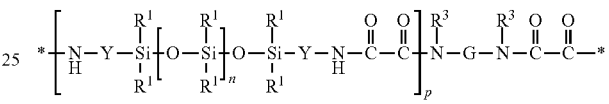

wherein each $R^1$ is independently an alkyl, haloalkyl, aralkyl, alkenyl, aryl, or aryl substituted with an alkyl, alkoxy, or halo; each Y is independently an alkylene, aralkylene, or a combination thereof; the subscript n is an integer of 0 to 1500; the subscript p is an integer of 1 to 10; G is a divalent linking group that is the residue unit of a diamine of formula $R^3HN$-G-$NHR^3$ minus the two —$NHR^3$ groups; $R^3$ is hydrogen or alkyl having 1 to 10 carbon atoms, or $R^3$ taken together with G and with the nitrogen to which they are both attached form a heterocyclic group; and each asterisk (*) indicates a site of attachment of the repeat unit to another group in the copolymer.

Embodiment 3 is the blend composition of embodiment 2, wherein the polydiorganosiloxane polyoxamide block copolymer comprising a linear copolymer that contains at least two repeat units of Formula I, wherein each $R^1$ is independently an alkyl having 1-3 carbon atoms; each Y is independently an alkylene having 1-5 carbon atoms; the subscript n is an integer of 0 to 10; the subscript p is an integer of 1 to 10; G is a divalent linking group of an alkylene, heteroalkylene, polydiorganosiloxane, arylene, aralkylene, or a combination thereof; each $R^3$ is hydrogen; and each asterisk (*) indicates a site of attachment of the repeat unit to another group in the copolymer.

Embodiment 4 is the blend composition of embodiment 1, wherein the at least one polydiorganosiloxane polyoxamide copolymer comprises a copolymer of general Formula II:

Formula II

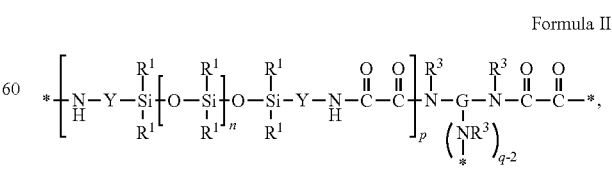

wherein each $R^1$ is independently an alkyl, haloalkyl, aralkyl, alkenyl, aryl, or aryl substituted with an alkyl, alkoxy, or halo; G is a q-valent residue unit of a polyamine of the formula G(NHR³)_q minus the q-NHR³ groups; subscript q is an integer of 2 or greater; each R³ is hydrogen or an alkyl having 1 to 10 carbon atoms, or R³ taken together with G and with the nitrogen to which they are both attached forms a heterocyclic group; each Y is independently an alkylene, aralkylene, or a combination thereof; subscript n is independently an integer of 0 to 1500; subscript p is an integer of 1 to 10; and each asterisk (*) indicates a site of attachment of the repeat unit to another group in the copolymer.

Embodiment 5 is the blend of composition of embodiment 4, wherein the polydiorganosiloxane polyoxamide copolymer comprising a linear copolymer that contains at least two repeat units of Formula II, wherein each R¹ is independently an alkyl having 1-3 carbon atoms; each Y is independently an alkylene having 1-5 carbon atoms; subscript n is an integer of 0 to 10; subscript p is an integer of 1 to 10; G is a q-valent linking group of an alkylene, heteroalkylene, polydiorganosiloxane, arylene, aralkylene, or a combination thereof; subscript q is an integer of 3 or greater; each R³ is hydrogen; and each asterisk (*) indicates a site of attachment of the repeat unit to another group in the copolymer.

Embodiment 6 is the blend composition of embodiment 1, wherein the at least one polydiorganosiloxane polyoxamide copolymer comprises a copolymer with at least one repeat unit of Formula II:

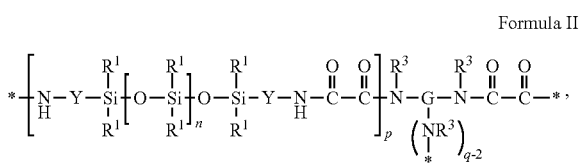

Formula II and at least one repeat unit of Formula III:

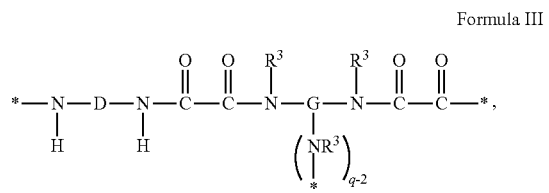

Formula III wherein each R¹ is independently an alkyl, haloalkyl, aralkyl, alkenyl, aryl, or aryl substituted with an alkyl, alkoxy, or halo; G is a q-valent residue unit of a polyamine of the formula G(NHR³)_q minus the q-NHR³ groups; subscript q is an integer of 2 or greater; each R³ is hydrogen or an alkyl having 1 to 10 carbon atoms, or R³ taken together with G and with the nitrogen to which they are both attached forms a heterocyclic group; each Y is independently an alkylene, aralkylene, or a combination thereof; subscript n is independently an integer of 0 to 1500; subscript p is an integer of 1 to 10; D is a polyoxyalkylene group; and each asterisk (*) indicates a site of attachment of the repeat unit to another group in the copolymer.

Embodiment 7 is the blend composition of embodiment 6, wherein the polydiorganosiloxane polyoxamide block copolymer comprising a copolymer that contains at least one repeat unit of Formula II and at least one repeat unit of Formula III, wherein each R¹ is independently an alkyl having 1-3 carbon atoms; each Y is independently an alkylene having 1-5 carbon atoms; subscript n is an integer of 0 to 10; subscript p is an integer of 1 to 10; G is a q-valent linking group of an alkylene, heteroalkylene, polydiorganosiloxane, arylene, aralkylene, or a combination thereof; subscript q is an integer of 3 or greater; each R³ is hydrogen; and D is a polyoxyethylene group, a polyoxypropylene group, a poly(oxyethylene-co-oxypropylene) group, or a combination thereof; and each asterisk (*) indicates a site of attachment of the repeat unit to another group in the copolymer.

Embodiment 8 is the blend composition of any of embodiments 1-7, wherein the blend composition comprises greater than 75% by weight of at least one silicone tackifying resins.

Embodiment 9 is the blend composition of any of embodiments 1-7, wherein the blend composition comprises greater than 80% by weight of at least one silicone tackifying resins.

Embodiment 10 is the blend composition of any of embodiments 1-7, wherein the blend composition comprises greater than 85% by weight of at least one silicone tackifying resins.

Embodiment 11 is the blend composition of any of embodiments 1-7, wherein the blend composition comprises greater than 90% by weight of at least one silicone tackifying resins.

Embodiment 12 is the blend composition of any of embodiments 1-11, wherein the at least one silicone tackifying resin comprises an MQ silicone tackifying resin, a MQD silicone tackifying resin, a MQT silicone tackifying resin, or a combination thereof.

Embodiment 13 is the blend composition of any of embodiments 1-12, wherein the at least one silicone tackifying resin comprises an MQ tackifying resin.

Embodiment 14 is the blend composition of any of embodiments 1-13, wherein the blend composition is in the form of a pellet, a rod, a flake, an ellipse, a chip or a powder crumb.

Embodiment 15 is the blend composition of any of embodiments 1-14, wherein the blend composition comprises at least one additional additive comprising a UV stabilizer, an antioxidant, an antimicrobial, a filler, a UV sensitizer, an enzyme, or an oil.

Embodiment 16 is the blend composition of embodiment 15, wherein the at least one additional additive comprises a siloxane oil.

Also disclosed are methods of preparing blend composition particles. Embodiment 17 includes a method of preparing a blend composition particle comprising: providing a polymeric composition comprising at least one polydiorganosiloxane polyoxamide copolymer; providing at least 70% by weight of at least one silicone tackifying resin; mixing the polymeric composition and the at least one silicone tackifying resin to form a blend composition; and forming the blend composition into a particle, wherein the blend composition particle is non-tacky at room temperature up to a temperature of at least 100° C.

Embodiment 18 is the method of embodiment 17, wherein mixing the polymeric composition and the at least one silicone tackifying resin to form a blend composition comprises hot melt mixing.

Embodiment 19 is the method of embodiment 18, wherein hot melt mixing comprises mixing in an extruder.

Embodiment 20 is the method of embodiment 19, wherein forming the blend composition into a particle comprises forcing the blend composition through a die to form a substantially homogeneous ribbon, forming pellets from the substantially homogeneous ribbon, and solidifying the pellets in a cooling medium.

Embodiment 21 is the method of embodiment 17, wherein mixing comprises solvent mixing, and further comprising adding at least one solvent to the polymeric composition, the silicone tackifying resin, or both; and wherein forming the blend composition into an article further comprises drying the formed article.

Embodiment 22 is the method of any of embodiments 17-21, wherein providing a polymeric composition comprising at least one polydiorganosiloxane polyoxamide copolymer further comprises: forming a reactive composition which upon reaction forms the polydiorganosiloxane polyoxamide; and reacting the reactive composition to form the polydiorganosiloxane.

Embodiment 23 is the method of any of embodiments 17-22, wherein the at least one polydiorganosiloxane polyoxamide block copolymer comprises a linear copolymer that contains at least two repeat units of Formula I:

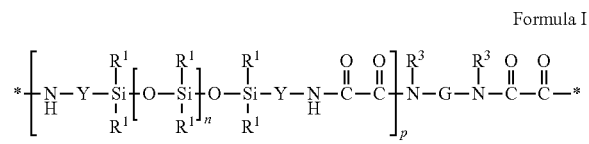

Formula I wherein each $R^1$ is independently an alkyl, haloalkyl, aralkyl, alkenyl, aryl, or aryl substituted with an alkyl, alkoxy, or halo; each Y is independently an alkylene, aralkylene, or a combination thereof; the subscript n is an integer of 0 to 1500; the subscript p is an integer of 1 to 10; G is a divalent linking group that is the residue unit of a diamine of formula $R^3HN$-G-$NHR^3$ minus the two —$NHR^3$ groups; $R^3$ is hydrogen or alkyl having 1 to 10 carbon atoms, or $R^3$ taken together with G and with the nitrogen to which they are both attached form a heterocyclic group; and each asterisk (*) indicates a site of attachment of the repeat unit to another group in the copolymer.

Embodiment 24 is the method of embodiment 23, wherein the polydiorganosiloxane polyoxamide block copolymer comprising a linear copolymer that contains at least two repeat units of Formula I, wherein each $R^1$ is independently an alkyl having 1-3 carbon atoms; each Y is independently an alkylene having 1-5 carbon atoms; the subscript n is an integer of 0 to 10; the subscript p is an integer of 1 to 10; G is a divalent linking group of an alkylene, heteroalkylene, polydiorganosiloxane, arylene, aralkylene, or a combination thereof; each $R^3$ is hydrogen; and each asterisk (*) indicates a site of attachment of the repeat unit to another group in the copolymer.

Embodiment 25 is the method of any of embodiments 17-22, wherein the at least one polydiorganosiloxane polyoxamide copolymer comprises a copolymer of general Formula II:

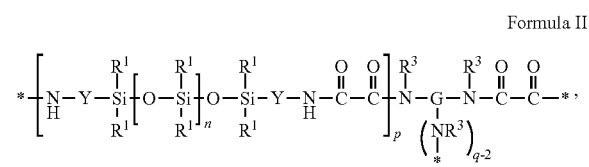

Formula II wherein each $R^1$ is independently an alkyl, haloalkyl, aralkyl, alkenyl, aryl, or aryl substituted with an alkyl, alkoxy, or halo; G is a q-valent residue unit of a polyamine of the formula $G(NHR^3)_q$ minus the q-$NHR^3$ groups; subscript q is an integer of 2 or greater; each $R^3$ is hydrogen or an alkyl having 1 to 10 carbon atoms, or $R^3$ taken together with G and with the nitrogen to which they are both attached forms a heterocyclic group; each Y is independently an alkylene, aralkylene, or a combination thereof; subscript n is independently an integer of 0 to 1500; subscript p is an integer of 1 to 10; and each asterisk (*) indicates a site of attachment of the repeat unit to another group in the copolymer.

Embodiment 26 is the method of embodiment 25, wherein the polydiorganosiloxane polyoxamide copolymer comprising a linear copolymer that contains at least two repeat units of Formula II, wherein each $R^1$ is independently an alkyl having 1-3 carbon atoms; each Y is independently an alkylene having 1-5 carbon atoms; subscript n is an integer of 0 to 10; subscript p is an integer of 1 to 10; G is a q-valent linking group of an alkylene, heteroalkylene, polydiorganosiloxane, arylene, aralkylene, or a combination thereof; subscript q is an integer of 3 or greater; each $R^3$ is hydrogen; and each asterisk (*) indicates a site of attachment of the repeat unit to another group in the copolymer.

Embodiment 27 is the method of any of embodiments 17-22, wherein the at least one polydiorganosiloxane polyoxamide copolymer comprises a copolymer with at least one repeat unit of Formula II:

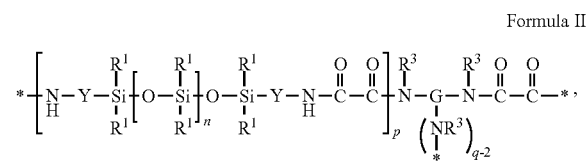

Formula II and at least one repeat unit of Formula III:

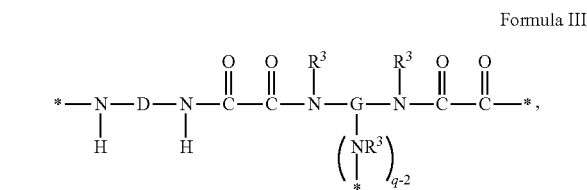

Formula III wherein each $R^1$ is independently an alkyl, haloalkyl, aralkyl, alkenyl, aryl, or aryl substituted with an alkyl, alkoxy, or halo; G is a q-valent residue unit of a polyamine of the formula $G(NHR^3)_q$ minus the q-$NHR^3$ groups; subscript q is an integer of 2 or greater; each $R^3$ is hydrogen or an alkyl having 1 to 10 carbon atoms, or $R^3$ taken together with G and with the nitrogen to which they are both attached forms a heterocyclic group; each Y is independently an alkylene, aralkylene, or a combination thereof; subscript n is independently an integer of 0 to 1500; subscript p is an integer of 1 to 10; D is a polyoxyalkylene group; and each asterisk (*) indicates a site of attachment of the repeat unit to another group in the copolymer.

Embodiment 28 is the method of embodiment 27, wherein the polydiorganosiloxane polyoxamide block copolymer comprising a copolymer that contains at least one repeat unit of Formula II and at least one repeat unit of Formula III, wherein each $R^1$ is independently an alkyl having 1-3 carbon atoms; each Y is independently an alkylene having 1-5 carbon atoms; subscript n is an integer of 0 to 10; subscript p is an integer of 1 to 10; G is a q-valent linking group of an alkylene, heteroalkylene, polydiorganosiloxane, arylene, aralkylene, or a combination thereof; subscript q is an integer of 3 or greater; each $R^3$ is hydrogen; and D is a polyoxyethylene group, a polyoxypropylene group, a poly(oxyethylene-co-oxypropylene) group, or a combination thereof; and each asterisk (*) indicates a site of attachment of the repeat unit to another group in the copolymer.

Embodiment 29 is the method of any of embodiments 17-28, wherein the blend composition comprises greater than 75% by weight of at least one silicone tackifying resins.

Embodiment 30 is the method of any of embodiments 17-28, wherein the blend composition comprises greater than 80% by weight of at least one silicone tackifying resins.

Embodiment 31 is the method of any of embodiments 17-28, wherein the blend composition comprises greater than 85% by weight of at least one silicone tackifying resins.

Embodiment 32 is the method of any of embodiments 17-28, wherein the blend composition comprises greater than 90% by weight of at least one silicone tackifying resins.

Embodiment 33 is the method of any of embodiments 17-32, wherein the at least one silicone tackifying resin comprises an MQ silicone tackifying resin, a MQD silicone tackifying resin, a MQT silicone tackifying resin, or a combination thereof.

Embodiment 34 is the method of any of embodiments 17-33, wherein the at least one silicone tackifying resin comprises an MQ tackifying resin.

Embodiment 35 is the method of any of embodiments 17-34, wherein the blend composition particles are in the form of a pellet, a rod, a flake, an ellipse, a chip or a powder crumb.

Embodiment 36 is the method of any of embodiments 17-35, wherein the blend composition comprises at least one additional additive comprising a UV stabilizer, an antioxidant, an antimicrobial, a filler, a UV sensitizer, an enzyme, or an oil.

Embodiment 37 is the method of embodiment 36, wherein the at least one additional additive comprises a siloxane oil.

Also disclosed are methods of using a blend composition. Embodiment 38 includes a method of using a blend composition comprising: providing a blend composition, wherein the blend composition comprises: a polymeric composition comprising at least one polydiorganosiloxane polyoxamide copolymer; and at least 70% by weight of at least one silicone tackifying resin, and wherein the blend composition is non-tacky at room temperature up to a temperature of at least 100° C.; providing a second polymeric composition comprising at least one polydiorganosiloxane polymer or copolymer, or a reactive composition that upon reaction forms a polydiorganosiloxane polymer or copolymer; and mixing the blend composition with the second polymeric composition to form a second blend composition, wherein the second blend composition comprises less than 70% by weight of the at least one silicon tackifying resin.

Embodiment 39 is the method of embodiment 38, wherein the second blend composition comprises a pressure sensitive adhesive.

Embodiment 40 is the method of embodiments 38 or 39, wherein the second polymeric composition comprises at least one polydiorganosiloxane polyoxamide copolymer.

Embodiment 41 is the method of any of embodiment 38-40, wherein the second polymeric composition comprises a reactive polydiorganosiloxane fluid composition which upon polymerization forms a polydiorganosiloxane matrix or a composition comprising a polydiorganosiloxane fluid which upon exposure to an electron beam forms a polydiorganosiloxane matrix.

Embodiment 42 is the method of embodiment 41, wherein the polydiorganosiloxane fluid is of Formula VII:

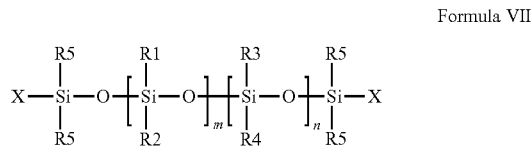

Formula VII wherein R1, R2, R3, and R4 are each independently an alkyl group, a substituted alkyl group, an aryl group, or a substituted aryl group; each R5 is an alkyl group; each X is: a functional group selected from: —OH; —OR where R is an alkyl or aryl group; a vinyl group; an allyl group; or a (meth)acrylate group; or a non-functional R5 group; and n and m are integers, such that at least one of m or n is not zero.

Embodiment 42 is the method of any of embodiment 38-41, further comprising providing at least one additive, and mixing the additive into the second blend composition.

Embodiment 43 is the method of any of embodiment 38-42, wherein mixing the blend composition with the second polymeric composition to form a second blend composition, comprises hot melt mixing.

Embodiment 44 is the method of any of embodiment 38-43, wherein mixing the blend composition with the second polymeric composition to form a second blend composition, comprises solvent mixing and the method further comprises dissolving the blend composition in at least one solvent, dissolving the second polymeric composition in at least one solvent, or both; and further comprises drying the second blend composition.

Embodiment 45 is the method of any of embodiment 38-44, further comprising applying UV radiation at or below the B spectral range to the second blend composition.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted. The following abbreviations are used: cm=centimeters; mm=millimeters; in=inch; m=meters; RPM=revolutions per minute; kg=kilograms; oz=ounces; lb=pounds; Pa=Pascals; min=minutes; and hr=hours. The terms "weight %", "% by weight", and "wt %" are used interchangeably.

Test Methods
180° Peel Adhesion

This peel adhesion test is similar to the test method described in ASTM D 3330-90, substituting a glass substrate, for the stainless steel substrate described in the test.

Unless otherwise noted, adhesive coatings on polyester film were cut into 1.27 centimeter by 15 centimeters strips. Each strip was then adhered to a 10 centimeters by 20 centimeters clean, solvent washed, glass coupon using a 2-kilogram roller passed once over the strip. The bonded assembly dwelled at room temperature for about one minute and was tested for 180° peel adhesion using an IMASS slip/peel tester (Model 3M90, commercially available from Instrumentors Inc., Strongsville, Ohio) at a rate of 2.3 meters/minute (90 inches/minute) over a five second data collection time. Three samples were tested; the reported peel adhesion value was an average of the peel adhesion value from each of the three samples. Peel adhesion values were recorded in ounces/inch (oz/in) and converted to Newtons/decimeter (N/dm).

Shear Strength

This shear strength test is similar to the test method described in ASTM D 3654-88. Unless otherwise noted, adhesive coatings on polyester film were cut into 1.27 centimeter (0.5 inch) by 15 centimeters (6 inch) strips. Each strip was then adhered to a stainless steel panel such that a 1.27 centimeters by 1.27 centimeter portion of each strip was in firm contact with the panel and one end portion of the tape being free. Unless otherwise noted, adhesive coatings on 2 layer backings were cure into 2.54 centimeter (1 inch) by 15 centimeter (6 inch) strips. Each strip was then adhered to a stainless steel panel such that a 2.54 centimeter (1 inch) by 2.54 centimeter (1 inch) portion of each strip was in firm contact with the panel and one end portion of the tape being free. The panel with a coated strip attached was held in a rack such that the panel formed an angle of 178 degrees with the extended tape free end which was tensioned by application of a force of one kilogram for adhesive coatings on polyester film backings, and for the adhesive coatings on 2 layer backings the extended tape free end was tensioned by application of a force of 250 grams, applied as a hanging weight from the free end of the coated strip. The 178 degrees was used to negate any peel forces, thus ensuring that only shear strength forces were measured, in an attempt to more accurately determine the holding power of the tape being tested. The time elapsed for each tape example to separate from the test panel was recorded as the shear strength. Three strips were tested for each sample, and the results averaged. All shear strength failures (if the adhesive failed at less than 10,000 minutes) reported herein were cohesive failures of the adhesive. Each test was terminated at 10,000 minutes, unless the adhesive failed at an earlier time (as noted).

Materials

| | |
|---|---|
| Elastomer 1 | A polydimethylsiloxane polyoxamide elastomer which may be prepared generally as described in Example 16 of U.S. Pat. No. 7,501,184, with an ester equivalent weight of 20,010 grams/equivalent (determined by titration as generally described in U.S. Pat. No. 8,063,166 (column 41, line 50 through column 42, line 3) formed into free-flowing pellets. Pellets of Elastomer 1 remained free-flowing after storage after 3 weeks at 40° C. and were also free-flowing after 1 year at room temperature. |
| MQ Resin | MQ-RESIN POWDER 803 TF available from Wacker AG, Munich Germany |
| Silicone Fluid | A silanol-terminal XIAMETER PDMS fluid with a viscosity of 50,000 centistokes (0.05 m²/s) commercially available as OHX-4070 from Dow Corning, Midland, MI. |
| PET Film | Polyester film of polyethylene terephthalate. |
| 2 Layer Backing | A backing film having 2 layers heat bonded together with the first layer being a nonwoven polymer material and the second layer being a thermoplastic polyester elastomer. The second layer had a three second Shore D hardness of 32 as tested per ISO 868, and a melting temperature of approximately 212° C. |

Example 1: Extrusion Blended Pellets of Elastomer 1 (21 wt. %) and MQ Resin (79 wt. %)

Extrusion blending was performed using a 70 mm planetary extruder from Entex Corporation (Bochum, North Rhine Westphalia, Germany) with three planet barrel sections and a single screw feed section of constant geometry. Pellets of Elastomer 1 were fed to the single screw feed section at a rate of 6 lb/hr (2.72 kg/hr) to the planetary extruder via a K-tron brand single screw pellet feeder. MQ Resin was fed via a K-tron 20 mm twin screw feeder to the second planetary section at a rate of 22.5 lb/hr (10.1 kg/hr). A 35 torr (4700 Pa) vacuum of was pulled through a side stuffer in the third section of the planetary extruder to remove volatiles and entrained air. Each barrel of the planetary extruder contained 6 standard planet screws. After planet barrels 1 and 2, a 34 mm dispersion ring was used to throttle flow of the material into the next section. The feed section was cooled with chilled water to 50° F. (10° C.). The three planet barrel sections were maintained at 500° F. (260° C.) and 50 rpm. The mixed material exited the third section of the planetary extruder into an Econ EUP-10 underwater pelletizer with a circulating water temperature of 65° F. (18° C.). The underwater pelletizer was fitted with a 2-hole die and the cutter of the pelletizer was operated at 1200 rpm, providing 45-50 lbs (20.4-22.7 kg) of free-flowing blended pellets. The blended pellets remained free-flowing after storage after 3 weeks at 40° C. and were also free-flowing after 1 year at room temperature.

Example 2. Dry Mixing of Extrusion Blended Pellets From Example 1 With Pellets of Elastomer 1

Pellets of Elastomer 1 (37 parts by weight) were hand-mixed with the extrusion blended pellets of Example 1 (63 parts by weight), thus providing a final ratio of Elastomer 1 to MQ Resin of 50:50 (wt. %). The resulting dry blended pellet mixture remained free-flowing after storage after least 3 weeks at 40° C. and were also free-flowing after 1 year at room temperature.

Examples 2a-2c. Pressure Sensitive Adhesive (PSA) Preparation From Example 2

The dry blended pellet mixture from Example 2 was dissolved in sufficient toluene:isopropyl alcohol (70:30 wt:wt) mixture to provide a solution with 20 wt. % solids. The solution was coated onto PET Film substrates at three different thicknesses as shown in Table 1, the coated films were dried at 70° C. for 10 minutes to remove solvent to provide PSA films, and the PSA films were performance tested. PSA performance results are shown in Table 1.

Comparative Examples CE1a-CE1c. Pressure Sensitive Adhesive (PSA) Preparation From MQ Resin and Elastomer 1

MQ Resin (powder) and Elastomer 1 (pellets) in a ratio of 50:50 (wt. %) were dissolved in sufficient toluene:isopropyl alcohol (70:30 wt:wt) mixture to provide a solution with 20 wt. % solids and a final ratio of Elastomer 1 to MQ Reisn of 50:50 (wt %). The solution was coated onto PET Film substrates at three different thicknesses, the coated films were dried at 70° C. for 10 minutes to remove solvent to provide PSA films, and the PSA films were performance tested. PSA performance results are shown in Table 1.

TABLE 1

| Example | Description | Dry Coating thickness mil (mm) | 180° Peel Adhesion, oz/in (N/dm) | Shear Strength, minutes |
|---|---|---|---|---|
| 2a | Solvent-coated PSA derived from dry blended pellet mixture of Example 2, with a final Elastomer 1 to MQ Resin of 50:50 (wt. %). | 0.5 (0.013) | 15.52 (16.99) | 10,000+ for all 3 samples (no slip or creep) |
| CE1a | Solvent-coated PSA derived from MQ Resin and Elastomer 1 directly, with a final Elastomer 1 to MQ Resin of 50:50 (wt. %). | 0.5 (0.013) | 23.76 (26.01) | 10,000+ for all 3 samples (no slip or creep) |
| 2b | Solvent-coated PSA derived from dry blended pellet mixture of Example 2, with a final Elastomer 1 to MQ Resin of 50:50 (wt. %). | 1.0 (0.025) | 21.09 (23.08) | 10,000+ for all 3 samples (no slip or creep) |
| CE1b | Solvent-coated PSA derived from MQ Resin and Elastomer 1 directly, with a final Elastomer 1 to MQ Resin of 50:50 (wt. %). | 1.0 (0.025) | 31.5 (34.5) | 10,000+ for all 3 samples (no slip or creep) |
| 2c | Solvent-coated PSA derived from dry blended pellet mixture of Example 2, with a final Elastomer 1 to MQ Resin of 50:50 (wt. %). | 2.0 (0.051) | 25.19 (27.57) | 10,000+ for all 3 samples (no slip or creep) |
| CE1c | Solvent-coated PSA derived from MQ Resin and Elastomer 1 directly, with a final Elastomer 1 to MQ Resin of 50:50 (wt. %). | 2.0 (0.051) | 39.28 (42.99) | 10,000+ for all 3 samples (no slip or creep) |

From Table 1, it can be seen that Examples 2a-2c provided acceptable peel adhesion and shear strength performance in relation to corresponding Comparative Examples CE1a-CE1c (control), despite the additional heat processing step used to prepare Example 1.

Example 3 and Comparative Example CE2

The components of Example 3 and Comparative Example CE2, as shown in Table 2, were dissolved in toluene at 48 weight % total solids to yield homogeneous solutions. Using a knife coater, these solutions were coated onto the 2 Layer backing. The toluene was removed by placing the coating in a drying oven maintained at 70° C. for 10 minutes. The dry thickness of the adhesives in Example 3 and Comparative Example CE2 is reported in the Table 3. The samples were further crosslinked with e-beam irradiation to form a tacky film. The radiation processing was performed on a Model 40767 electron beam generating apparatus (PCT, Davenport, Iowa). A support film (polyethylene terephthalate) was run through the inerted chamber of the apparatus. The adhesives coated on the backing were attached to the support film and conveyed at a fixed speed of about 9 meters/min through the e-beam apparatus. The adhesive and process is described in U.S. Pat. No. 8,541,481 (Determan et al.) examples 1-12.

TABLE 2

| Example preparation | Silicone Fluid | MQ Resin | Example 1 Pellets |
|---|---|---|---|
| 3 | 69 | — | 38.75 |
| CE2 | 69 | 31 | — |

TABLE 3

| Example | E Beam Dose (Mrads) | Thickness mils, (micrometers) | Peel adhesion to Stainless oz/in, (N/dm) | Peel adhesion to PVC oz/in, (N/dm) | Shear 1" × 1" with 250 g (mins) |
|---|---|---|---|---|---|
| 3a | 7 | 4.9, (124) | 7.0, (7.7) | 8.4, (9.2) | >10,000 |
| 3b | 7.5 | 4.8, (122) | 6.7, (7.3) | 4.6, (5.0) | >10,000 |
| CE2a | 7 | 3.2, (81) | 8.2, (9.0) | 5.7, (6.2) | 829 |
| CE2b | 7.5 | 3.3, (84) | 7.9, (8.6) | 6.4, (7.0) | 929 |

What is claimed is:

1. A blend composition comprising:
   a polymeric composition comprising at least one polydiorganosiloxane polyoxamide copolymer; and
   at least 70% by weight of at least one silicone tackifying resin,
   wherein the blend composition is non-tacky at room temperature up to a temperature of at least 100° C.

2. The blend composition of claim 1, wherein the at least one polydiorganosiloxane polyoxamide block copolymers comprises a linear copolymer that contains at least two repeat units of Formula I:

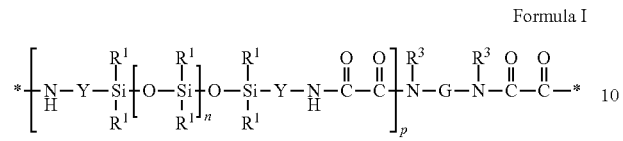

Formula I wherein each $R^1$ is independently an alkyl, haloalkyl, aralkyl, alkenyl, aryl, or aryl substituted with an alkyl, alkoxy, or halo;
each Y is independently an alkylene, aralkylene, or a combination thereof;
the subscript n is an integer of 0 to 1500;
the subscript p is an integer of 1 to 10;
G is a divalent linking group that is the residue unit of a diamine of formula $R^3HN$-G-$NHR^3$ minus the two —$NHR^3$ groups;
$R^3$ is hydrogen or alkyl having 1 to 10 carbon atoms, or $R^3$ taken together with G and with the nitrogen to which they are both attached form a heterocyclic group; and
each asterisk (*) indicates a site of attachment of the repeat unit to another group in the copolymer.

3. The blend composition of claim 2, wherein the polydiorganosiloxane polyoxamide block copolymer comprising a linear copolymer that contains at least two repeat units of Formula I, wherein each $R^1$ is independently an alkyl having 1-3 carbon atoms;
each Y is independently an alkylene having 1-5 carbon atoms;
the subscript n is an integer of 0 to 10;
the subscript p is an integer of 1 to 10;
G is a divalent linking group of an alkylene, heteroalkylene, polydiorganosiloxane, arylene, aralkylene, or a combination thereof;
each $R^3$ is hydrogen; and
each asterisk (*) indicates a site of attachment of the repeat unit to another group in the copolymer.

4. The blend composition of claim 1, wherein the at least one polydiorganosiloxane polyoxamide copolymer comprises a copolymer of general Formula II:

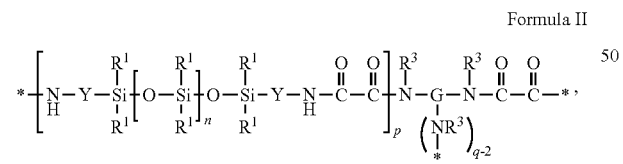

Formula II wherein each $R^1$ is independently an alkyl, haloalkyl, aralkyl, alkenyl, aryl, or aryl substituted with an alkyl, alkoxy, or halo;
G is a q-valent residue unit of a polyamine of the formula $G(NHR^3)_q$ minus the q-$NHR^3$ groups;
subscript q is an integer of 2 or greater;
each $R^3$ is hydrogen or an alkyl having 1 to 10 carbon atoms, or $R^3$ taken together with G and with the nitrogen to which they are both attached forms a heterocyclic group;
each Y is independently an alkylene, aralkylene, or a combination thereof;

subscript n is independently an integer of 0 to 1500;
subscript p is an integer of 1 to 10; and
each asterisk (*) indicates a site of attachment of the repeat unit to another group in the copolymer.

5. The blend composition of claim 4, wherein the polydiorganosiloxane polyoxamide copolymer comprising a linear copolymer that contains at least two repeat units of Formula II, wherein each $R^1$ is independently an alkyl having 1-3 carbon atoms;
each Y is independently an alkylene having 1-5 carbon atoms;
subscript n is an integer of 0 to 10;
subscript p is an integer of 1 to 10;
G is a q-valent linking group of an alkylene, heteroalkylene, polydiorganosiloxane, arylene, aralkylene, or a combination thereof;
subscript q is an integer of 3 or greater;
each $R^3$ is hydrogen; and
each asterisk (*) indicates a site of attachment of the repeat unit to another group in the copolymer.

6. The blend composition of claim 1, wherein the at least one polydiorganosiloxane polyoxamide copolymer comprises a copolymer with at least one repeat unit of Formula II:

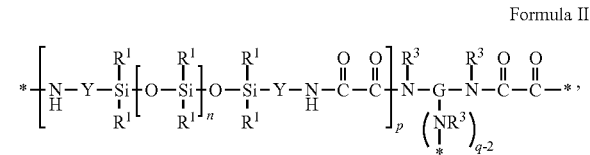

Formula II and at least one repeat unit of Formula III:

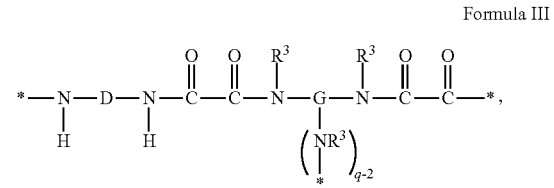

Formula III wherein each $R^1$ is independently an alkyl, haloalkyl, aralkyl, alkenyl, aryl, or aryl substituted with an alkyl, alkoxy, or halo;
G is a q-valent residue unit of a polyamine of the formula $G(NHR^3)_q$ minus the q-$NHR^3$ groups;
subscript q is an integer of 2 or greater;
each $R^3$ is hydrogen or an alkyl having 1 to 10 carbon atoms, or $R^3$ taken together with G and with the nitrogen to which they are both attached forms a heterocyclic group;
each Y is independently an alkylene, aralkylene, or a combination thereof;
subscript n is independently an integer of 0 to 1500;
subscript p is an integer of 1 to 10;
D is a polyoxyalkylene group; and
each asterisk (*) indicates a site of attachment of the repeat unit to another group in the copolymer.

7. The blend composition of claim 6, wherein the polydiorganosiloxane polyoxamide block copolymer comprising a copolymer that contains at least one repeat unit of Formula II and at least one repeat unit of Formula III, wherein each $R^1$ is independently an alkyl having 1-3 carbon atoms;
each Y is independently an alkylene having 1-5 carbon atoms;
subscript n is an integer of 0 to 10;
subscript p is an integer of 1 to 10;
G is a q-valent linking group of an alkylene, heteroalkylene, polydiorganosiloxane, arylene, aralkylene, or a combination thereof;
subscript q is an integer of 3 or greater;
each $R^3$ is hydrogen; and
D is a polyoxyethylene group, a polyoxypropylene group, a poly(oxyethylene-co-oxypropylene) group, or a combination thereof; and
each asterisk (*) indicates a site of attachment of the repeat unit to another group in the copolymer.

8. The blend composition of claim 1, wherein the blend composition comprises greater than 90% by weight of at least one silicone tackifying resin.

9. The blend composition of claim 1, wherein the at least one silicone tackifying resin comprises an MQ silicone tackifying resin, a MQD silicone tackifying resin, a MQT silicone tackifying resin, or a combination thereof.

10. The blend composition of claim 1, wherein the at least one silicone tackifying resin comprises an MQ tackifying resin.

11. The blend composition of claim 1, wherein the blend composition is in the form of a pellet, a rod, a flake, an ellipse, a chip or a powder crumb.

12. The blend composition of claim 1, wherein the blend composition comprises at least one additional additive comprising a UV stabilizer, an antioxidant, an antimicrobial, a filler, a UV sensitizer, an enzyme, or an oil.

13. A method of preparing a blend composition particle comprising:
providing a polymeric composition comprising at least one polydiorganosiloxane polyoxamide copolymer;
providing at least 70% by weight of at least one silicone tackifying resin;
mixing the polymeric composition and the at least one silicone tackifying resin to form a blend composition; and
forming the blend composition into a particle, wherein the blend composition particle is non-tacky at room temperature up to a temperature of at least 100° C.

14. The method of claim 13, wherein mixing the polymeric composition and the at least one silicone tackifying resin to form a blend composition comprises hot melt mixing.

15. The method of claim 13, wherein mixing comprises solvent mixing, and
further comprising adding at least one solvent to the polymeric composition, the silicone tackifying resin, or both; and
wherein forming the blend composition into an article further comprises drying the formed article.

16. The method of claim 13, wherein providing a polymeric composition comprising at least one polydiorganosiloxane polyoxamide copolymer further comprises:
forming a reactive composition which upon reaction forms the polydiorganosiloxane polyoxamide; and
reacting the reactive composition to form the polydiorganosiloxane.

17. The method of claim 13, wherein forming the blend composition particle comprises forming pellets, rods, flakes, ellipses, chips or powder crumbs.

18. A method of using a blend composition comprising:
providing a blend composition, wherein the blend composition comprises:
a polymeric composition comprising at least one polydiorganosiloxane polyoxamide copolymer; and
at least 70% by weight of at least one silicone tackifying resin, and wherein the blend composition is non-tacky at room temperature up to a temperature of at least 100° C.;
providing a second polymeric composition comprising at least one polydiorganosiloxane polymer or copolymer, or a reactive composition that upon reaction forms a polydiorganosiloxane polymer or copolymer; and
mixing the blend composition with the second polymeric composition to form a second blend composition, wherein the second blend composition comprises less than 70% by weight of the at least one silicon tackifying resin.

19. The method of claim 18, wherein the second blend composition comprises a pressure sensitive adhesive.

20. The method of claim 18, wherein the second polymeric composition comprises a reactive polydiorganosiloxane fluid composition which upon polymerization forms a polydiorganosiloxane matrix or a composition comprising a polydiorganosiloxane fluid which upon exposure to an electron beam forms a polydiorganosiloxane matrix.

21. The method of claim 18, further comprising applying UV radiation at or below the B spectral range to the second blend composition.

* * * * *